US011500081B2

(12) United States Patent
Sugae

(10) Patent No.: US 11,500,081 B2
(45) Date of Patent: Nov. 15, 2022

(54) OBJECT DETECTION DEVICE AND OBJECT DETECTION SYSTEM

(71) Applicant: AISIN CORPORATION, Kariya (JP)

(72) Inventor: Ippei Sugae, Kariya (JP)

(73) Assignee: AISIN CORPORATION, Kariya (JP)

( * ) Notice: Subject to any disclaimer, the term of this patent is extended or adjusted under 35 U.S.C. 154(b) by 345 days.

(21) Appl. No.: 16/437,053

(22) Filed: Jun. 11, 2019

(65) Prior Publication Data
US 2019/0377074 A1 Dec. 12, 2019

(30) Foreign Application Priority Data
Jun. 12, 2018 (JP) .............................. JP2018-112226

(51) Int. Cl.
| G01S 15/42 | (2006.01) |
| G01S 7/526 | (2006.01) |
| G01S 15/10 | (2006.01) |
| G01S 15/04 | (2006.01) |

(52) U.S. Cl.
CPC .............. G01S 7/526 (2013.01); G01S 15/04 (2013.01); G01S 15/104 (2013.01); G01S 15/42 (2013.01)

(58) Field of Classification Search
CPC ........ G01S 7/526; G01S 15/04; G01S 15/104; G01S 15/42
See application file for complete search history.

(56) References Cited

U.S. PATENT DOCUMENTS

| 8,726,733 B2 * | 5/2014 | Hashimoto ........... G01S 15/104 73/597 |
| 2011/0001661 A1 * | 1/2011 | Ohnishi ................... G01S 13/42 342/202 |
| 2015/0003205 A1 * | 1/2015 | Urase ....................... G01S 7/527 367/93 |
| 2016/0213258 A1 | 7/2016 | Lashkari et al. |
| 2016/0350974 A1 * | 12/2016 | Hashimoto ........... G06T 19/006 |

FOREIGN PATENT DOCUMENTS

| DE | 102016118431 A1 * | 5/2017 | ............ G01S 7/354 |
| JP | 2001305115 A * | 10/2001 | |
| JP | 2013-156223 A | 8/2013 | |
| WO | 2011/102130 A1 | 8/2011 | |

* cited by examiner

Primary Examiner — Isam A Alsomiri
Assistant Examiner — Abdallah Abulaban
(74) Attorney, Agent, or Firm — Sughrue Mion, PLLC

(57) ABSTRACT

An object detection device includes: a transmission/reception unit that has a vibrator capable of transmitting and receiving ultrasound, that causes the vibrator to transmit transmission signals at different timings, and that receives the reception signals returning after being reflected on a circumferentially existing object; an acquisition unit that acquires a first distance to the object, based on a time difference between a transmission timing of a first transmission signal and a reception timing of a first reception signal, and that acquires a relative speed of the object, based on a frequency difference between the first transmission signal and the first reception signal; an estimation unit that estimates a second distance to the object at a transmission timing of a second transmission signal to be transmitted subsequently to the first transmission signal; and an adjustment unit that adjusts the number of waves or a transmission time of the second transmission signal.

19 Claims, 11 Drawing Sheets

OBJECT DETECTION DEVICE AND OBJECT DETECTION SYSTEM

CROSS REFERENCE TO RELATED APPLICATIONS

This application is based on and claims priority under 35 U.S.C. § 119 to Japanese Patent Application 2018-112226, filed on Jun. 12, 2018, the entire contents of which are incorporated herein by reference.

TECHNICAL FIELD

Embodiments of this disclosure relate to an object detection device and an object detection system.

BACKGROUND DISCUSSION

In the related art, a technique for acquiring information relating to an object, such as a distance up to the object, is known as follows. A transmission signal is transmitted as ultrasound by a vibrator such as a piezoelectric element, and the transmission signal reflected on the object is received as a reception signal by the vibrator. The information is acquired by acquiring a difference between transmission and reception timings of the ultrasound.

JP 2013-156223A and International Publication No. WO2011/102130 are examples of the related art.

In some cases, an object detection device needs to continuously detect an object without losing sight of the object detected once, even in a case where a distance up to the object is changed due to movement of the object detection device or the object.

SUMMARY

An object detection device according to an aspect of this disclosure includes, for example, a transmission/reception unit that has a vibrator capable of transmitting and receiving ultrasound, that causes the vibrator to transmit a plurality of transmission signals at respectively different timings, and that receives each of the plurality of transmission signals returning after being reflected on a circumferentially existing object, as a reception signal, an acquisition unit that acquires a first distance serving as a distance up to the object, based on a time difference between a transmission timing of a first transmission signal out of the plurality of transmission signals and a reception timing of a first reception signal which is the first transmission signal returning after being reflected on the object, and that acquires a relative speed of the object, based on a frequency difference between the first transmission signal and the first reception signal, an estimation unit that estimates a second distance serving as the distance up to the object at a transmission timing of a second transmission signal to be transmitted subsequently to the first transmission signal, based on the first distance and the relative speed, and an adjustment unit that adjusts the number of waves or a transmission time of the second transmission signal, based on the second distance.

An object detection system according to another aspect of this disclosure includes, for example, a transmission/reception unit that has a vibrator capable of transmitting and receiving ultrasound, that causes the vibrator to transmit a plurality of transmission signals at respectively different timings, and that receives each of the plurality of transmission signals returning after being reflected on a circumferentially existing object, as a reception signal, an acquisition unit that acquires a first distance serving as a distance up to the object, based on a time difference between a transmission timing of a first transmission signal out of the plurality of transmission signals and a reception timing of a first reception signal which is the first transmission signal returning after being reflected on the object, and that acquires a relative speed of the object, based on a frequency difference between the first transmission signal and the first reception signal, an estimation unit that estimates a second distance serving as the distance up to the object at a transmission timing of a second transmission signal to be transmitted subsequently to the first transmission signal, based on the first distance and the relative speed, and an adjustment unit that adjusts the number of waves or a transmission time of the second transmission signal, based on the second distance.

An object detection system according to another aspect of this disclosure includes a plurality of object detection devices each including a transmission/reception unit that has a vibrator capable of transmitting and receiving ultrasound, that causes the vibrator to transmit a transmission signal which is a chirp signal in which a frequency repeatedly increases or decreases in every predetermined cycle according to a preset pattern, and outputs a detection signal corresponding to circumferentially received ultrasound, and an acquisition unit that specifies the transmission signal included in the detection signal and returning after being reflected on a circumferentially existing object, as a reception signal, based on the pattern, and that acquires information relating to the object, based on the transmission signal and the reception signal, and a setting unit that sets respectively different patterns in the plurality of object detection devices.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments disclosed here will be disclosed. Configurations of the embodiments described below, and operations, results, or advantageous effects which are achieved by the configurations are merely examples. The embodiments disclosed here can also be realized by those which other than the configurations disclosed in the following embodiments, and can obtain at least one of various advantageous effects based on basic configurations and derivative advantageous effects.

Hereinafter, a case will be described where an object detection system according to the embodiments is applied to a vehicle. The object detection system according to the embodiments is applicable to any desired system in addition to the vehicle.

First Embodiment

Figure 1:
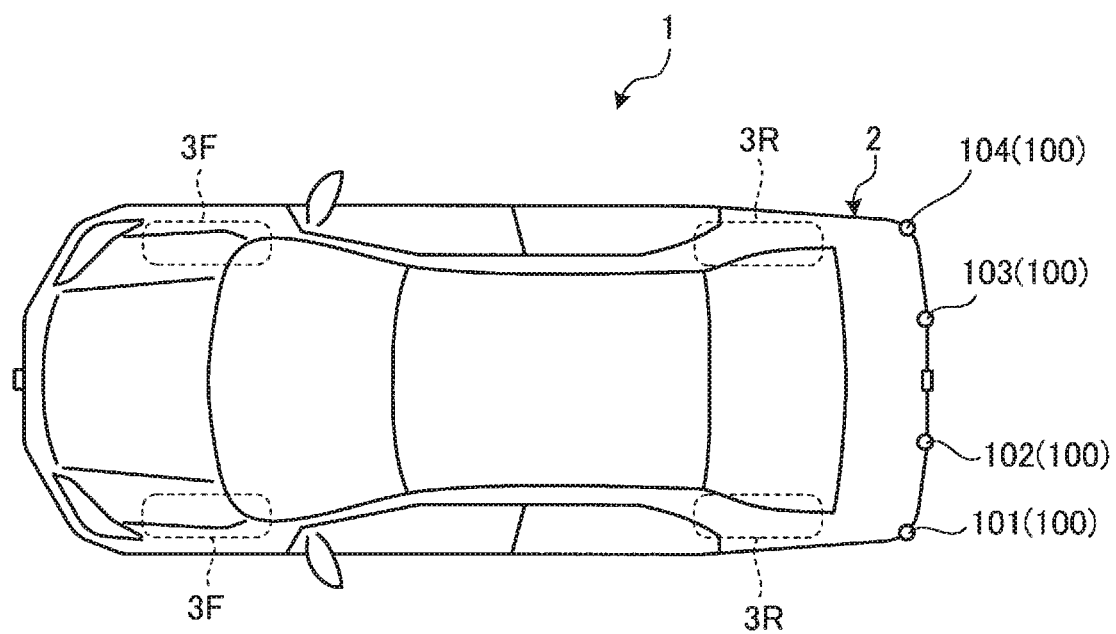
FIG. 1 is an exemplary and schematic view illustrating an outer configuration when a vehicle serving as an object detection system according to a first embodiment is viewed from above.

FIG. 1 is an exemplary and schematic view illustrating an outer configuration when a vehicle 1 serving as an object detection system according to a first embodiment is viewed from above. The vehicle 1 includes object detection devices 101 to 104.

Although details will be described later, the object detection devices 101 to 104 are sensing devices that detect information relating to an object (for example, an obstacle X1 illustrated in FIG. 2) including a circumferentially existing human by transmitting and receiving ultrasound, and by acquiring a time difference between transmission and reception timings.

As illustrated in FIG. 1, the object detection devices 101 to 104 are mounted on a vehicle body 2 of the vehicle 1 having four wheels including a pair of right and left front wheels 3F and a pair of right and left rear wheels 3R. More specifically, the object detection devices 101 to 104 are installed at mutually different positions in a rear end of the vehicle body 2, for example, in a rear bumper. The object detection devices 101 to 104 may be installed at mutually different positions in a front end of the vehicle body 2, for example, in a front bumper. In addition, the object detection devices 101 to 104 may be respectively disposed in the front end, for example, in the front bumper and the rear bumper of the vehicle body 2. Furthermore, the object detection devices 101 to 104 may be installed at mutually different positions on a left side surface or a right side surface of the vehicle body 2. In addition, the object detection devices 101 to 104 may be disposed on a left side or a right side of the vehicle body 2 instead of disposing the object detection devices 101 to 104 in a traveling direction of the vehicle body 2. That is, an installation position of the object detection devices 101 to 104 is not limited to a specific position.

In addition, the number of the object detection devices installed in the vehicle 1 is not limited to four. One to three, five or more of the object detection devices may be installed in the vehicle 1.

In the vehicle 1, for example, an electronic control unit (ECU) can use information detected by each of the object detection devices 101 to 104 for any desired control. For example, each of the object detection devices 101 to 104 transmits data obtained by converting a time into a distance. The ECU calculates a position of the object by means of a trilateration method using the data obtained by converting the time into the distance, which is received from the object detection devices 101 to 104. The ECU uses the calculated position of the object in controlling obstacle avoidance, parking assistance, automatic cruise, and automatic driving. The information transmitted to the ECU as information relating to the object and processes in the ECU using the information are not limited to the above-described example.

Next, a configuration of the object detection devices 101 to 104 according to the first embodiment will be described. In the embodiment, hardware configurations and functions of the object detection devices 101 to 104 are the same as each other. Therefore, hereinafter, in order to simplify the description, the object detection devices 101 to 104 may be collectively referred to as an object detection device 100.

Figure 2:
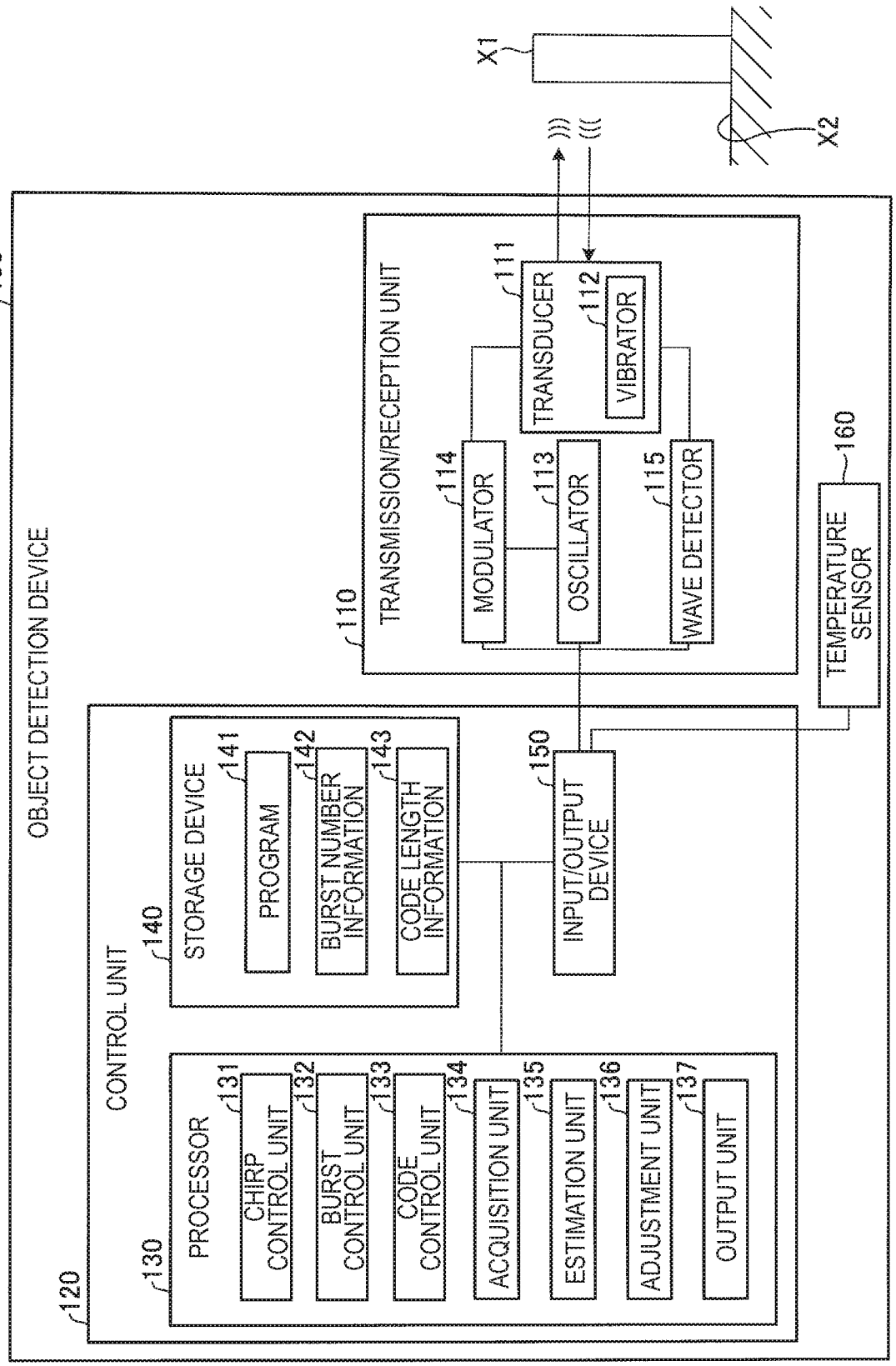
FIG. 2 is an exemplary and schematic view illustrating a configuration of an object detection device according to the first embodiment.

FIG. 2 is an exemplary and schematic view illustrating a configuration of the object detection device 100 according to the first embodiment. As illustrated in FIG. 2, the object detection device 100 has a transmission/reception unit 110 and a control unit 120.

The transmission/reception unit 110 has a transducer 111. The transducer 111 has a vibrator 112 such as a piezoelectric element, and the vibrator 112 realizes transmission and reception of the ultrasound.

More specifically, the transducer 111 transmits the ultrasound generated in response to vibration of the vibrator 112, as a transmission signal, and receives the vibration of the vibrator 112 which is generated by the ultrasound transmitted as the transmission signal and returning after being reflected on the externally existing object, as a reception signal. In FIG. 2, the obstacle X1 installed on a road surface X2 is illustrated as the object on which the ultrasound transmitted from the transducer 111 is reflected.

A reciprocating time of the signal, that is, the time difference between a transmission timing of the transmission signal and a reception timing of the reception signal, linearly corresponds to a distance up to the object on which the transmission signal is reflected. The control unit 120 acquires the distance up to the object from the reciprocating time of the signal. For example, this method is well known as a Time-Of-Flight method.

Here, amplitude of the ultrasound attenuates depending on a propagation distance. Accordingly, in a case where the object located at a long distance needs to be detected, it is necessary to transmit the transmission signal having sufficient intensity so that the transmission signal reflected on the object can be detected as the reception signal.

In a case where the vibrator 112 such as a piezoelectric element is vibrated with predetermined amplitude, the vibrator 112 cannot be vibrated with intended amplitude immediately after the vibration starts. It takes a predetermined time for the amplitude to have an intended magnitude after the vibrator 112 starts vibrating. Then, during the predetermined time, the amplitude increases with the lapse of time.

Therefore, during the period until the amplitude reaches a constant value after the transmission signal starts to be transmitted, the intensity of the ultrasound increases as the transmission time of the transmission signal is lengthened. In this manner, the object located farther can be detected. According to the present embodiment, a time during which the transmission signal is continuously transmitted is set to a transmission time.

On the other hand, even if the transmission signal is completely transmitted and the vibrator 112 stops to be driven, the vibrator 112 is continuously vibrated due to inertia. Accordingly, after the transmission signal is completely transmitted, it takes time (so-called reverberation time) for the vibration of the vibrator 112 to settle down the vibration. During this reverberation time, the reception signal is less likely to be detected. In a case where the reception signal arrives at the transducer 111 during the reverberation time since the distance up to the object is too close, the object is less likely to be detected.

A length of the reverberation time depends on the amplitude of the vibration of the vibrator 112. As the transmission time of the transmission signal is shortened, the vibration amplitude of the vibrator 112 decreases, thereby shortening the reverberation time. Therefore, it becomes possible to detect the object located closer.

In this way, a detectable range of the object varies depending on the transmission time. If the transmission time is lengthened, both an upper limit value and a lower limit value of the detectable range increase. If the transmission time is shortened, both the upper limit value and the lower limit value of the detectable range decrease.

The object detection device 100 detects the object at a predetermined time interval in order to recognize information of a circumferentially existing object of the vehicle 1 on a substantially real time basis. That is, the object detection device 100 detects the object several times at different timings.

Here, the movement of the vehicle 1 or the object may change the distance up to the object, in some cases. Accordingly, even in a case where the object is detected at a certain detection timing, the distance up to the object deviates from the detectable range at a subsequent detection timing, that is, at a timing for subsequently transmitting the transmission signal. Consequently, sight of the object may be lost, in some cases.

If the object detection device 100 according to the first embodiment detects the object, the object detection device 100 estimates the distance up to the object at the subsidiary detection timing, and adjusts the transmission time of the transmission signal to be transmitted at the subsequent detection timing in accordance with the estimated distance. Hereinafter, an example of a method of adjusting the transmission time according to the first embodiment will be described with reference to FIG. 3.

A timing at which the transmission signal is finally detected may be referred to as a current detection timing. The current detection timing is a detection timing which immediately precedes a subsequent detection timing.

In addition, a distance acquired at the current detection timing, that is, a distance at the current detection timing, may be referred to as a current distance or a current distance Dcrr. In addition, an estimation value of the distance up to the object at the subsequent detection timing may be referred to as a next time distance or a next time distance Dnxt.

Figure 3:
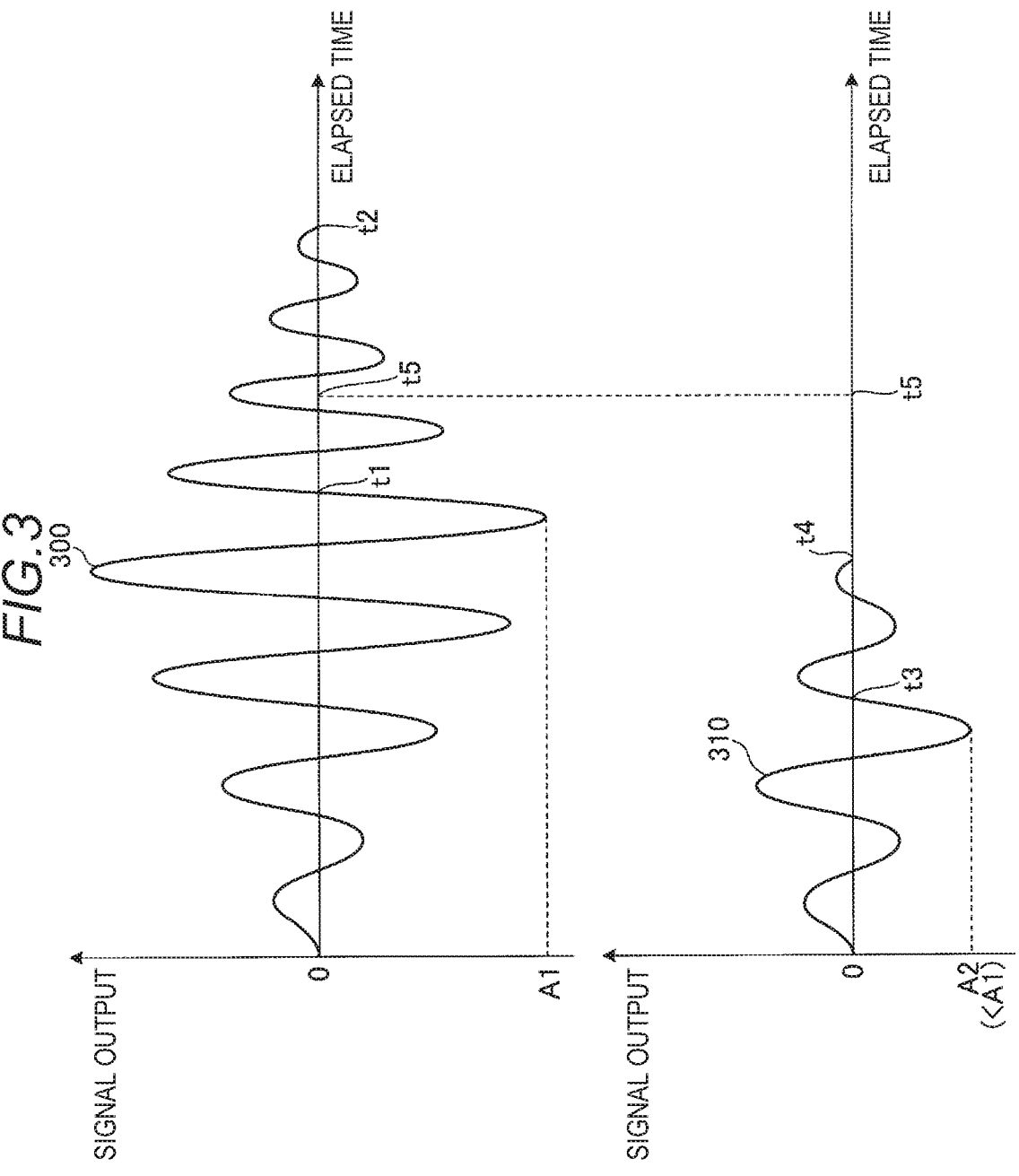
FIG. 3 is an exemplary and schematic view illustrating a waveform of a transmission signal according to the first embodiment.

FIG. 3 is an exemplary and schematic view illustrating a waveform of the transmission signal according to the first embodiment. A waveform 300 represents a waveform of the ultrasound emitted by the vibrator 112 in a case where a period corresponding to four cycles is set as the transmission time.

According to the waveform 300, during a period from time 0 to time t1 at which the vibrator 112 completes the vibration corresponding to the four cycles, it can be understood that the ultrasound corresponding to the four cycles in which the amplitude increases with the lapse of time is transmitted as the transmission signal. The amplitude when the transmission signal is completely transmitted is expressed by A1. During a period until time t2 from time t1 at which the transmission signal is completely transmitted, the ultrasound is transmitted due to reverberation.

A waveform 310 represents a waveform of the ultrasound generated by the vibrator 112 in a case where a period corresponding to two cycles is set as the transmission time.

According to the waveform 310, during a period from time 0 to time t3 at which the vibrator 112 completes the vibration corresponding to the two cycles, it can be understood that the ultrasound corresponding to the two cycles is transmitted as the transmission signal. The amplitude when the transmission signal is completely transmitted is expressed by A2 which is smaller than A1. During a period until time t4 from time t3 at which the transmission signal is completely transmitted, the ultrasound is transmitted due to reverberation. Compared to the waveform 300, according to the waveform 310, both the transmission time and the reverberation time are shortened. Accordingly, a time at which the reverberation is settled down is quickened from t2 to t4.

For example, the object detection device 100 detects the object at the current detection timing by using the transmission signal illustrated by the waveform 300. Then, the object detection device 100 estimates the distance up to the object (next time distance) at the subsequent detection timing, based on a result of detecting the object at the current detection timing.

In a case where the next time distance is shorter than the current distance and the transmission signal having the same waveform (waveform 300) is transmitted at the subsequent detection timing, in a situation where it is expected that the reception signal returns before the reverberation time is settled down (for example, time t5), the object detection device 100 transmits the transmission signal illustrated by the waveform 310, for which the transmission time is further shortened.

According to the waveform 310, compared to the waveform 300, the time at which the reverberation is settled down is quickened. For example, the reverberation is completely settled down at time t5. That is, at the subordinate detection timing, even in a situation where the reception signal returns from the object at time t5, the object detection device 100 can detect the reception signal by using the transmission signal of the waveform 310. Accordingly, even at the subsequent detection timing, the object detection device 100 can detect the object detected at the current detection timing.

In addition, the object detection device 100 can extend the transmission time. For example, the object detection device 100 detects the object by using the transmission signal of the waveform 310 at the current detection timing. Then, the object detection device 100 estimates the distance up to the object (next time distance) at the subsidiary detection timing, based on a detection result.

In a situation where the next time distance is longer than the current distance and the next time distance exceeds the upper limit value of the detectable range when the transmission signal of the waveform 310 is transmitted, at the subsequent detection timing, the object detection device 100 transmits the transmission signal of the waveform 300 for which the transmission time is extended.

According to the waveform 300, the amplitude when the transmission signal is completely transmitted is larger than that of the waveform 310. Therefore, the upper limit value of the detectable range can be made greater. At the subsequent detection timing, the object detection device 100 can detect the object detected at the current detection timing again by transmitting the transmission signal having the waveform 300.

In this way, the object detection device 100 adjusts the transmission time in accordance with the estimated next time distance. Accordingly, for example, in a case where the distance up to the object rapidly decreases or the distance up to the object rapidly increases, the object detection device 100 can continuously detect the object.

In the first embodiment, the transmission time of the transmission signal is defined as the number of bursts, as an example. The number of bursts means the number of waves (number of cycles) transmitted consecutively. For example, the waveform 300 illustrated in FIG. 3 corresponds to the transmission signal of the number of bursts "4. The waveform 310 illustrated in FIG. 3 corresponds to the transmission signal of the number of bursts "2". The number of bursts may not necessarily be an integer value. For example, the number of bursts may be a value having digits after the decimal point, such as "2.5". In the following description, the transmission time of the transmission signal may be referred to as a burst period, in some cases.

Incidentally, the object detection device 100 calculates a relative speed by using a frequency difference according to the Doppler effect, and calculates the next time distance, based on the calculated relative speed. In the first embodiment, as an example, a chirp signal is used as the transmission signal in order to obtain the frequency difference according to the Doppler effect.

The chirp signal is a signal whose instantaneous frequency is changed according to a time from a start frequency to an end frequency. If the frequency reaches the end frequency, the frequency returns to the start frequency, and is changed again from the start frequency. That is, the chirp signal is a signal in which the frequency repeatedly increases or decreases in every predetermined cycle.

Figure 4:
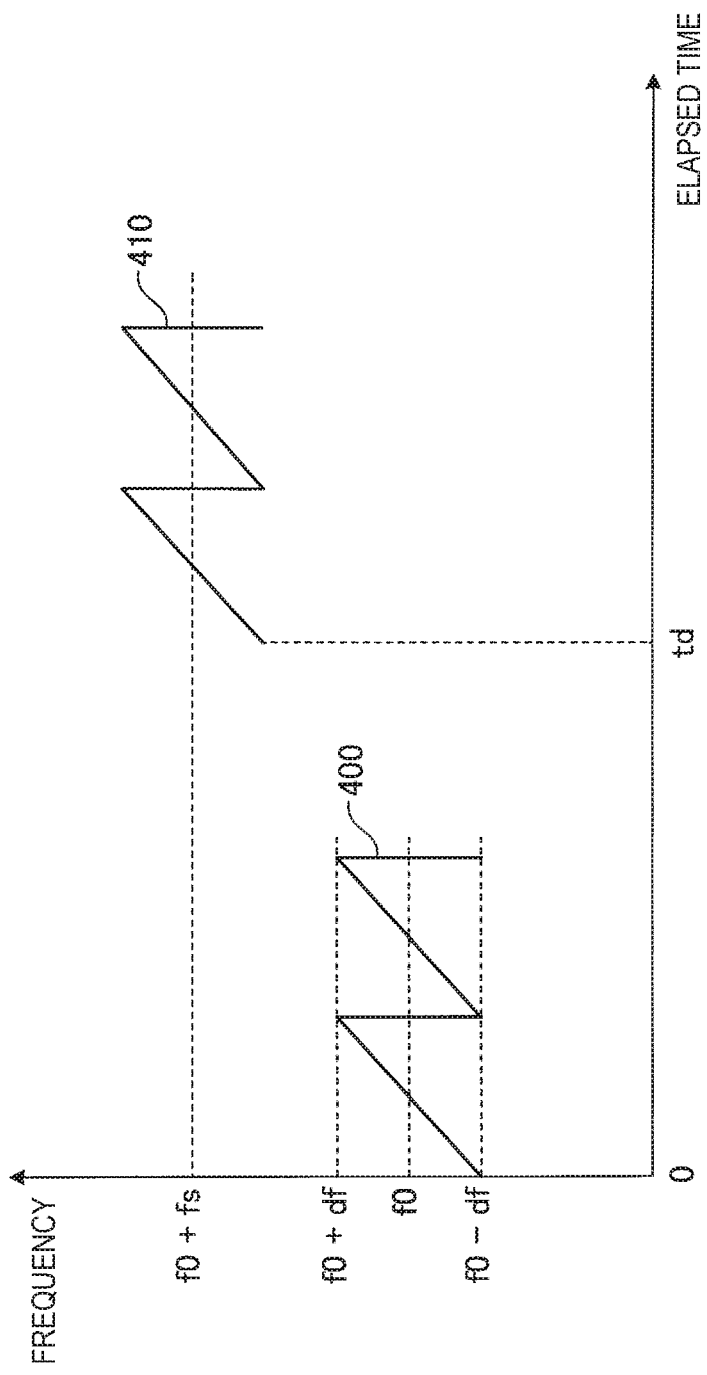
FIG. 4 is an exemplary and schematic view illustrating the time to frequency characteristic of a signal transmitted and received by a transmission/reception unit according to the first embodiment.

FIG. 4 is an exemplary and schematic view illustrating the time to frequency characteristic of the signal transmitted and received by the transmission/reception unit 110 according to the first embodiment. In the drawing, a horizontal axis represents an elapsed time, and a vertical axis represents a frequency.

A waveform 400 represents the time to frequency characteristic of the transmission signal. According to the waveform 400, it can be read that the transmission signal is a chirp signal in which the instantaneous frequency is changed from $f_0-df$ to $f_0+df$.

The waveform 410 represents the time to frequency characteristic of the transmission signal (that is, the reception signal) returning after being reflected on the object. According to the waveform 410, it can be read that the time to frequency characteristic of the reception signal has the same sawtoothed shape as that of the transmission signal, although the frequency and the time are shifted based on the transmission signal.

The object detection device 100 transmits the transmission signal having the waveform 400, and calculates the time to frequency characteristic from the output signal of the transducer 111. Then, the object detection device 100 searches for the waveform having the same sawtoothed shape as that of the waveform 400 from the time to frequency characteristic of the output signal. In this manner, the object detection device 100 can specify the reception signal (the time to frequency characteristic of the reception signal) included in the time to frequency characteristic of the output signal.

The object detection device 100 can acquire (calculate) a frequency difference fs between the transmission signal and the reception signal, based on the time to frequency characteristic of the specified reception signal.

The change pattern of the instantaneous frequency of the transmission signal is not limited to the above-described example. As long as the waveform of the time to frequency characteristic of the reception signal can be specified from the time to frequency characteristic of the output signal of the transducer 111, the signal having any desired pattern can be adopted as the transmission signal. Furthermore, as long as the frequency difference between the transmission signal and the reception signal can be acquired, the instantaneous frequency of the transmission signal may not necessarily be changed.

Referring back to FIG. 2, the description will be continued. In addition to the transducer 111, the transmission/reception unit 110 has an oscillator 113, a modulator 114, and a wave detector 115. For example, the configurations can be realized by means of hardware using an analog circuit. The oscillator 113, the modulator 114, and the wave detector 115 may be partially or entirely realized by means of software.

For example, the oscillator 113 is a voltage control oscillator, and oscillates a signal having the frequency according to a voltage applied to a variable capacitance diode incorporated therein. The oscillator 113 oscillates a chirp signal, based on a voltage signal supplied from the control unit 120 to the variable capacitance diode. The oscillator 113 supplies the oscillated chirp signal to the modulator 114.

The modulator 114 modulates the signal input from the oscillator 113, and supplies the modulated signal to the transducer 111, as a voltage signal for vibrating the vibrator 112.

For example, the modulator 114 receives identification information from the control unit 120. The modulator 114 performs encoding for assigning the identification information to the chirp signal supplied from the oscillator 113.

For example, the identification information is a bit string consisting of a sequence of 0 or 1 bits. The length of the bit string corresponds to a code length of the identification information assigned to the transmission signal. The modulator 114 performs modulation according to each bit of the bit string, thereby realizing the encoding for assigning the identification information corresponding to the bit string to the transmission signal. As a modulation method, it is possible to use a single or a combination of generally known methods such as an amplitude modulation method, a phase modulation method, and a frequency modulation method. In addition, the modulator 114 may be configured to appropriately switch a plurality of modulation methods, based on an instruction from the control unit 120.

Furthermore, the modulator 114 receives a burst control signal for defining a burst period from the control unit 120. For example, the burst control signal is a signal which is set as a predetermined logic (for example, logic "1") in the burst period and is set to another logic (for example, logic "0") in a period other than the burst period. The modulator 114 supplies the chirp signal to the transducer 111 in a case where the burst control signal indicates the burst period, and the modulator 114 controls the supply of the chirp signal in a case where the burst control signal indicates the period other than the burst period.

A sequence of performing the signal processing based on the burst control signal and the encoding is not limited to the above-described sequence. The encoding may be performed after the signal processing based on the burst control signal.

The transducer 111 vibrates the vibrator 112 by using the signal supplied from the modulator 114 as a drive signal. The vibrator 112 can externally transmit the transmission signal corresponding to the drive signal. The transducer 111 transmits the transmission signal encoded in the burst period, and stops the transmission of the transmission signal if the burst period ends.

The vibrator 112 generates a voltage signal corresponding to mechanical vibration caused by the ultrasound reaching from the outside after the transmission of the transmission signal is stopped. The transducer 111 amplifies the voltage signal generated by the vibrator 112, and outputs the amplified voltage signal.

The wave detector 115 calculates frequency information indicating a time change (time to frequency characteristic) of the frequency from the output signal of the transducer 111. For example, the frequency information can be calculated by using a Fast Fourier Transform (FFT) circuit. The wave detector 115 supplies the frequency information to the control unit 120, as a detection signal.

The control unit 120 includes a processor 130, a storage device 140, and an input/output device 150. That is, the control unit 120 has the same hardware configuration as that of an ordinary computer capable of executing a program.

The input/output device 150 is an interface device that outputs various signals to the transmission/reception unit 110 or receives various signals output from the transmission/reception unit 110.

The storage device 140 includes a nonvolatile storage medium such as a read only memory (ROM), a flash memory, a hard disk drive (HDD), and an SD card, and a volatile storage medium such as random access memory (RAM) and a register. Then, a program 141 executed by the processor 130 is stored in advance in the storage device 140.

For example, the processor 130 is a central processing unit (CPU). The processor 130 executes the program 141 stored in the storage device 140 so as to function as a chirp control unit 131, a burst control unit 132, a code control unit 133, an acquisition unit 134, an estimation unit 135, an adjustment unit 136, and an output unit 137. Functional configuration elements realized by the processor 130 may be partially or entirely realized by means of hardware using a dedicated analog circuit.

For example, the chirp control unit 131 supplies the voltage signal whose voltage is changed in a sawtoothed shape with the lapse of time, to the oscillator 113, thereby causing the oscillator 113 to oscillate the chirp signal corresponding to the voltage signal.

The burst control unit 132 controls a burst control signal supplied to the modulator 114 so that the transducer 111 can transmit the transmission signal having a predetermined number of bursts.

For example, in a case where the burst control unit 132 starts the transmission of the transmission signal, the logic of the burst control signal is changed from the logic indicating the period other than the burst period to the logic indicating the burst period, at the timing that the instantaneous frequency of the chirp signal oscillated by the oscillator 113 reaches the start frequency. Thereafter, the burst control unit 132 maintains the logic of the burst control signal until the oscillator 113 completely oscillates the signal having the predetermined number of bursts. If the oscillator 113 completely oscillates the signal having the predetermined number of bursts, the burst control unit 132 returns the logic of the burst control signal to the logic indicating the period other than the burst period. The modulator 114 can supply the drive signal having the predetermined number of bursts to the transducer 111 by using the burst control signal generated in this way.

The code control unit 133 generates identification information having a predetermined determined code length, and supplies the generated identification information to the modulator 114. For example, the identification information may be a Barker code, or may be a bit string having any desired pattern other than the Barker code. A code length of the identification information is set to a transmittable length in the burst period.

The acquisition unit 134 acquires the relative speed of the object, based on a frequency difference between the transmission signal and the reception signal. In addition, the acquisition unit 134 acquires the distance up to the object as information relating to the object, based on a reciprocating time of the signal. Hereinafter, an example of a method by which the acquisition unit 134 acquires various items of information will be described.

For example, the acquisition unit 134 specifies the reception signal (time to frequency characteristic of the reception signal) from the frequency information supplied from the wave detector 115. In addition, the acquisition unit 134 calculates the time to frequency characteristic of the transmission signal, based on an output of the burst control unit 132 or the chirp control unit 131. The acquisition unit 134 acquires the frequency difference (for example, fs in FIG. 4), based on the comparison between the time to frequency characteristic of the transmission signal and the time to frequency characteristic of the reception signal.

A relationship between the frequency difference fs and a relative speed Vr can be approximately expressed by Equation (1) below. However, Vs is a sound velocity. Here, a sign of the frequency difference fs in a case where the frequency of the reception signal is greater than the frequency of the transmission signal is defined as positive, and the relative speed Vr in a case where the object moves away from the object detection device 100 is defined as positive.

$$Vr = fs * Vs/(2*f0) \quad (1)$$

For example, the acquisition unit 134 calculates the relative speed Vr by substituting the sound velocity Vs, a center frequency f0 of the transmission signal, and an acquired shift amount fs into Equation (1).

In addition, based on the comparison between the time to frequency characteristic of the transmission signal and the time to frequency characteristic of the reception signal, the acquisition unit 134 acquires a time difference (for example, td in FIG. 4) between the transmission timing of the transmission signal and the reception timing of the reception signal.

The time difference td corresponds to a reciprocating time of the signal. The acquisition unit 134 can calculate the current distance Dcrr by substituting the sound velocity Vs and the acquired delay time td into Equation (2) below.

$$Dcrr = Vs * td/2 \quad (2)$$

The sound velocity Vs varies in response to a temperature. The acquisition unit 134 may use a predetermined fixed value as the sound velocity Vs, or may use a value acquired based on a temperature.

For example, the object detection device 100 may be provided with a temperature sensor (temperature sensor 160 in FIG. 2). In this case, the acquisition unit 134 acquires a temperature detection value T from the temperature sensor 160. Then, the acquisition unit 134 acquires the sound velocity Vs by substituting the temperature detection value T into Approximate Equation (3) below. Then, the acquisition unit 134 substitutes the acquired sound velocity Vs into Equation (1) or Equation (2).

$$Vs = (331.5 + 0.61 * T) \text{m/s} \quad (3)$$

The temperature sensor 160 may be omitted from the configuration of the object detection device 100, and the acquisition unit 134 may acquire the temperature detection value T from the outside (for example, the ECU). For example, the temperature sensor may be connected to the ECU, and the acquisition unit 134 may acquire the temperature detection value T from the ECU by using the temperature sensor.

In addition, the ECU may acquire the temperature detection value T from the temperature sensor connected to the ECU itself, and may calculate the sound velocity Vs by using the acquired temperature detection value T through Equation (3). The acquisition unit 134 may acquire the sound velocity Vs from the ECU.

The above-described method of calculating the relative speed Vr and the current distance Dcrr is an example. The acquisition unit 134 can calculate the relative speed Vr by using any desired method based on the frequency difference fs between the transmission signal and the reception signal. In addition, the acquisition unit 134 can calculate the current distance Dcrr by using any desired method based on the time difference td.

Any desired method can be used as a method of specifying the reception signal from the frequency information. Hereinafter, three methods of specifying the reception signal will be described as an example.

According to a first method, the acquisition unit 134 specifies the reception signal included in the frequency information by searching for the waveform having the same shape as that of the transmission signal. For example, in order to search for the waveform, it is possible to use a method of correlating the time to frequency characteristic of the transmission signal with the frequency information.

Specifically, the acquisition unit 134 acquires a correlation value between the time to frequency characteristic and the frequency information of the transmission signal. Based on a comparison result between the correlation value and a threshold, the acquisition unit 134 determines whether or not a degree of similarity is a predetermined level or higher. The correlation value peaks beyond the threshold in a case where the waveform of the time to frequency characteristic of the transmission signal and the waveform of the time to frequency characteristic of the frequency information coincide with each other. For example, the correlation value can be acquired (calculated), based on a generally well-known autocorrelation function. The acquisition unit 134 uses the correlation value acquired based on the autocorrelation function, and determines whether or not both the time to frequency characteristic of the transmission signal and the frequency information are similar to each other (coincide with each other) at the predetermined level or higher. Then, in a case where both the time to frequency characteristic of the transmission signal and the frequency information are similar to each other (coincide with each other) at the predetermined level or higher, the acquisition unit 134 specifies the coincident portion of the frequency information, as the time to frequency characteristic of the reception signal.

According to a second method, the acquisition unit 134 specifies the reception signal included in the frequency information by searching for a signal provided with the same information as the identification information assigned to the transmission signal.

Specifically, in addition to the frequency information, the transmission/reception unit 110 supplies an output signal of the transducer 111 (that is, a signal before being input to the wave detector 115) to the control unit 120, as the detection signal. The acquisition unit 134 acquires a bit string from the output signal by performing decoding on the output signal of the transducer 111 by using a method corresponding to the modulation method used by the modulator 114 during the encoding. The acquisition unit 134 compensates for influence of the Doppler effect included in the output signal before decoding. The acquisition unit 134 specifies the reception signal included in the output signal by searching for the same bit string as that of the identification information assigned to the transmission signal from the bit string acquired by decoding. In a case where the reception signal can be specified, the acquisition unit 134 specifies the portion of the frequency information which corresponds to the reception signal, as the time to frequency characteristic of the reception signal.

In a process of searching for the same bit string as that of the identification information from the bit string obtained from the output signal, for example, a method using the correlation value can be used. For example, the acquisition unit 134 acquires the correlation value, based on an autocorrelation function between the bit string obtained from the output signal and the identification information. Then, the acquisition unit 134 uses the acquired correlation value so as to determine whether or not both the bit string obtained from the output signal and the identification information are similar to each other (coincident with each other) at the predetermined level or higher. Then, in a case where both the bit string obtained from the output signal and the identification information are similar to each other (coincident with each other) at the predetermined level or higher, the acquisition unit 134 can specify the corresponding portion of the output signal, as the reception signal.

According to a third method, the first method and the second method are used in combination with each other. That is, the acquisition unit 134 tries to specify the reception signal by using both the first method and the second method. In a case where the same portion is specified by using both the methods, the acquisition unit 134 determines the specified portion of the reception signal, as the time to frequency characteristic.

The first to third methods are merely examples. The acquisition unit 134 can be configured to specify the time to frequency characteristic of the reception signal by using a method other than the first to third method.

Based on the relative speed Vr and the current distance Dcrr, the estimation unit 135 estimates the distance up to the object (next time distance Dnxt) at the subsequent detection timing.

For example, the estimation unit 135 can calculate the next time distance Dnxt by using Equation (4) below. However, tstep represents a time interval (time interval for the detection timing) for transmitting the transmission signal.

$$Dnxt=Dcrr+Vr*tstep \quad (4)$$

The above-described estimation method is an example. The estimation unit 135 can calculate the next time distance Dnxt by using any desired method, based on the relative speed Vr and the current distance Dcrr.

The adjustment unit 136 adjusts the number of bursts, based on the estimated next time distance Dnxt.

Figure 5:
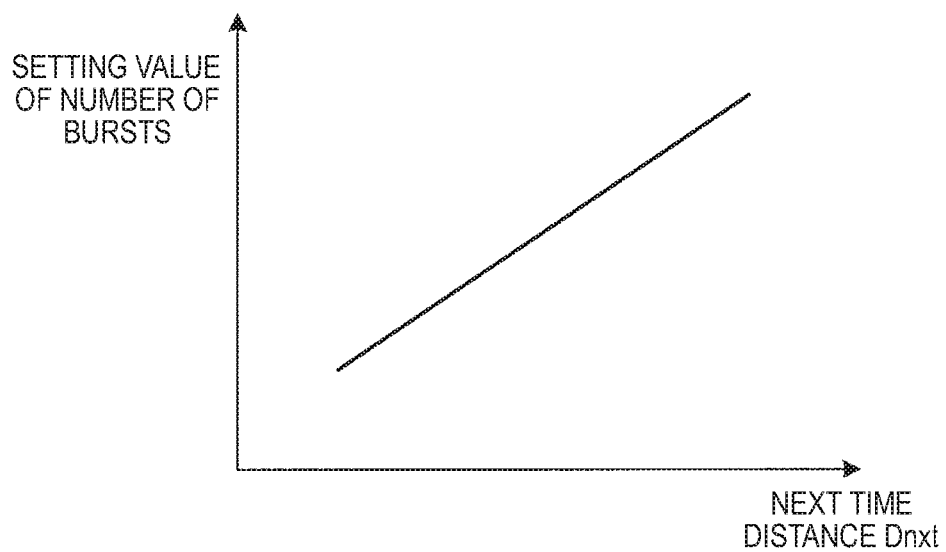
FIG. 5 is an exemplary and schematic diagram illustrating a correspondence between a next time distance and a setting value of the number of bursts which are used by an adjustment unit according to the first embodiment.

FIG. 5 is an exemplary and schematic view illustrating a correspondence between the next time distance Dnxt used by the adjustment unit according to the first embodiment and a setting value of the number of bursts. In the drawing, the horizontal axis represents the next time distance Dnxt, and the vertical axis represents the setting value of the number of bursts.

The correspondence between the setting value of the number of bursts and the next time distance Dnxt is defined so that the next time distance Dnxt is included in the detectable range. As described above, both a maximum value and a minimum value of the detectable range increase or decrease in response to an increase or a decrease in the burst period. Therefore, as illustrated in FIG. 5, the relation between the next time distance Dnxt and the number of bursts of the setting value is defined so that the setting value of the number of bursts linearly increases in accordance with an increase in the next time distance Dnxt.

The adjustment unit 136 calculates the setting value of the number of bursts in accordance with the correspondence illustrated in FIG. 5, and sets the calculated setting value of the number of bursts in the burst control unit 132. The burst control unit 132 generates a burst control signal indicating the burst period corresponding to the number of bursts newly set by the adjustment unit 136, at the subordinate detection timing.

The correspondence between the next time distance Dnxt and the setting value of the number of bursts is not limited to the correspondence illustrated in FIG. 5. The adjustment unit 136 may set a second value as the number of bursts in a case where the next time distance Dnxt is a first value, and may set a fourth value greater than the second value as the number of bursts in a case where the next time distance Dnxt is a third value greater than the first value. For example, the setting value of the number of bursts may gradually increase in response to an increase in the next time distance Dnxt. The setting value of the number of bursts may have an upper limit value corresponding to the burst period during which the amplitude of the transmission signal is saturated.

A relationship between the next time distance Dnxt and the setting value of the number of bursts is prepared in advance. For example, the relationship between the next time distance Dnxt and the setting value of the number of bursts is recorded in burst number information 142, and is stored in the storage device 140 in advance. The adjustment unit 136 can calculate the setting value of the number of bursts by referring to burst number information 142.

The burst number information 142 may be incorporated into the program 141, as a conditional branch syntax which splits in response to the next time distance Dnxt. In addition, the burst number information 142 may be incorporated into the program 141 as a function.

A maximum code length of the identification information which can be assigned to the transmission signal depends on the number of bursts of the transmission signal. As the number of bursts increases, the code length of the identification information which can be assigned is lengthened. Therefore, the adjustment unit 136 adjusts the code length, based on the estimated next time distance Dnxt.

Figure 6:
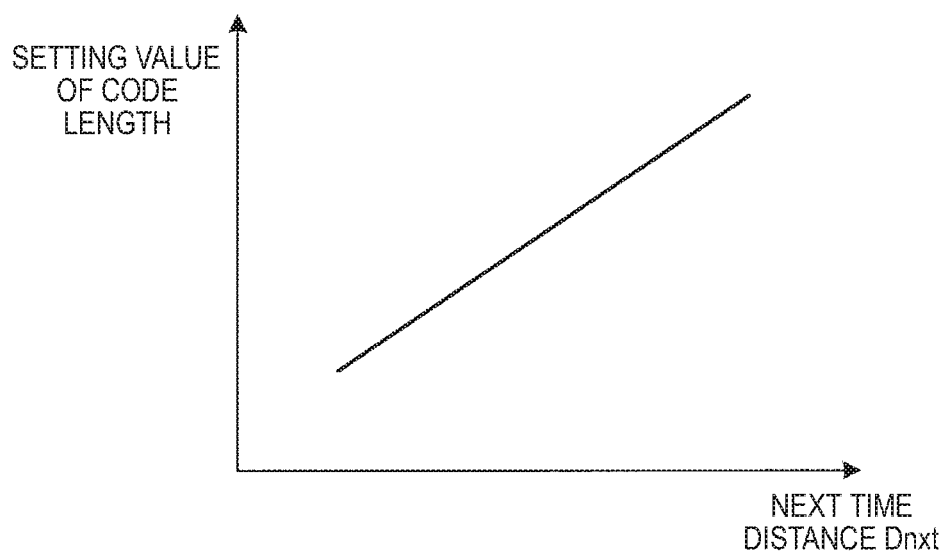
FIG. 6 is an exemplary and schematic diagram illustrating a correspondence between the next time distance and a setting value of a code length which are used by the adjustment unit according to the first embodiment.

FIG. 6 is an exemplary and schematic view illustrating a correspondence between the next time distance Dnxt used by the adjustment unit according to the first embodiment and the setting value of the code length. In the drawing, the horizontal axis represents the next time distance Dnxt, and the vertical axis represents the setting value of the code length. As illustrated in the drawing, the relationship between the next time distance Dnxt and the setting value of the code length is defined so that the setting value of the code length linearly increases in accordance with an increase in the next time distance Dnxt.

The above-described correspondence is an example. The adjustment unit 136 may set a sixth value as the code length in a case where the next time distance Dnxt is a fifth value, and may set an eighth value greater than the sixth value as the code length in a case where the next time distance Dnxt is a seventh value greater than the fifth value. For example, the setting value of the code length may gradually increase in response to an increase in the next time distance Dnxt. The setting value of the code length may have the upper limit value corresponding to the burst period during which the amplitude of the transmission signal is saturated.

In this way, according to the present embodiment, as the next time distance Dnxt is lengthened, the code length can be lengthened. In other words, as the next time distance Dnxt is lengthened, it is possible to specify the reception signal, based on the identification information of the long code length. In this manner, it is possible to improve accuracy in specifying the reception signal. On the other hand, in a case where the next time distance Dnxt is short, the code length is shortened. However, in a case where the next time distance Dnxt is short, the signal intensity of the reception signal is strong. Therefore, the reception signal can be easily specified, even if the code length is short.

The relationship between the next time distance Dnxt and the setting value of the code length is prepared in advance. For example, the relationship between the next time distance Dnxt and the setting value of the code length is recorded in code length information 143, and is stored in the storage device 140 in advance. The adjustment unit 136 can calculate the setting value of the code length by referring to the code length information 143.

The code length information 143 may be incorporated into the program 141, as a conditional branch syntax which splits in response to the next time distance Dnxt. In addition, the code length information 143 may be incorporated into the program 141 as a function.

The adjustment unit 136 sets the setting value of the code length in the code control unit 133. The code control unit 133 generates the identification information of the code length newly set by the adjustment unit 136, at the subsidiary detection timing.

The output unit 137 outputs the current distance Dcrr acquired by the acquisition unit 134 to the outside (for example, the ECU mounted on the vehicle 1), as information relating to the object.

The output unit 137 can output any desired information, as the information relating to the object. For example, the output unit 137 may output the relative speed Dr. In addition, the output unit 137 may output the next time distance Dnxt. In addition, the output unit 137 may output the presence or absence of the object.

Next, an operation of the object detection device 100 according to the first embodiment will be described.

Figure 7:
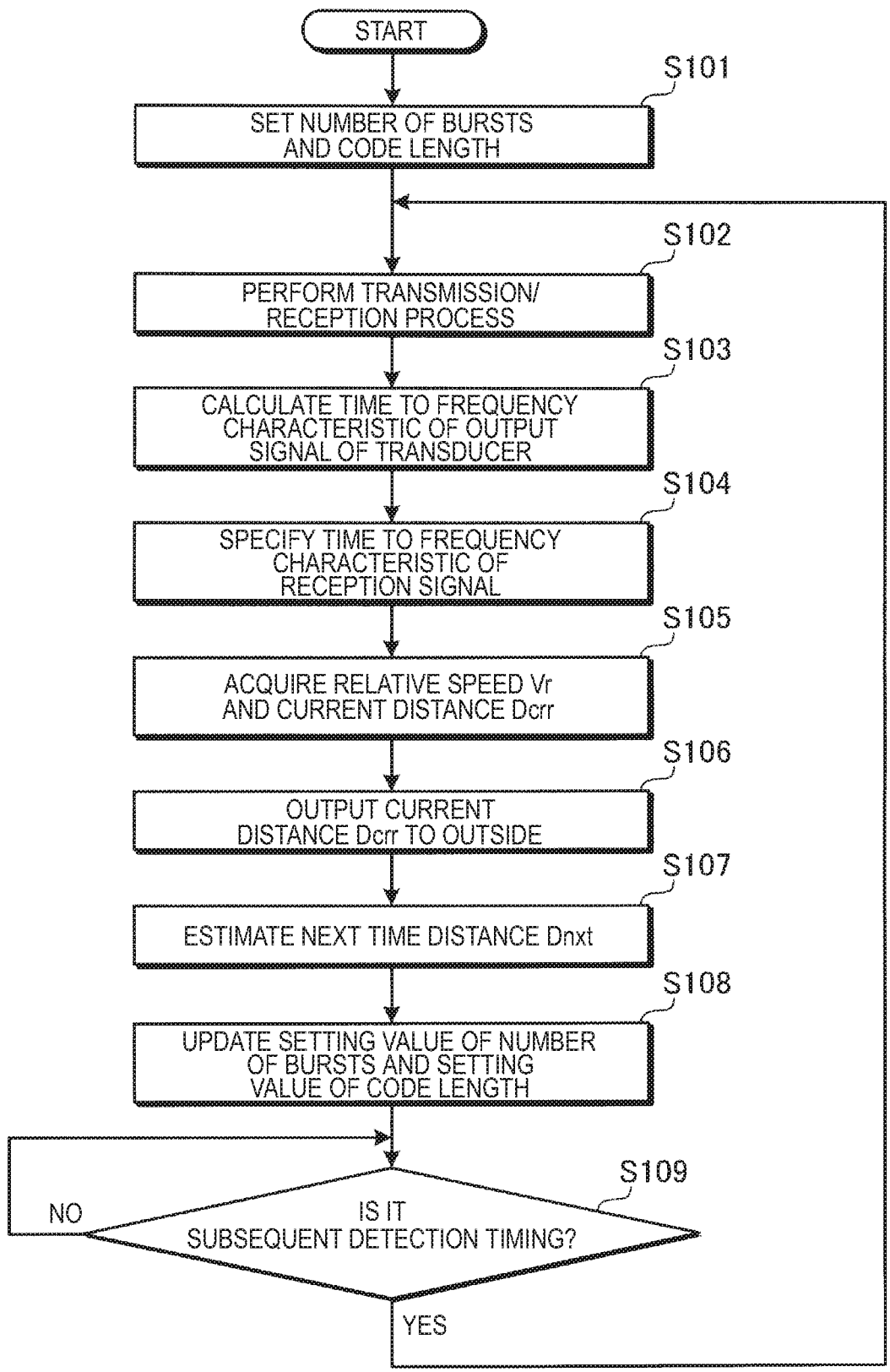
FIG. 7 is an exemplary and schematic flowchart illustrating a series of processes performed by the object detection device according to the first embodiment.

FIG. 7 is an exemplary and schematic flowchart illustrating a series of processes performed by the object detection device 100 according to the first embodiment.

First, the adjustment unit 136 sets the number of bursts and the code length (S101). For example, an initial value of the number of bursts and an initial value of the code length are respectively determined in advance, and the adjustment unit 136 sets each initial value.

Subsequently, the transmission/reception unit 110 performs a transmission/reception process (S102). Specifically, as the transmission signal, the transducer 111 transmits the chirp signal to which the identification information of the set code length is assigned in the burst period corresponding to the set number of bursts. After the signal is completely transmitted, the transducer 111 outputs an output signal corresponding to mechanical vibration of the vibrator 112.

The processes from S102 to S109 (to be described later) configure a loop process. The loop process is repeatedly performed at a predetermined time interval, for example. In this manner, the transmission/reception unit 110 transmits a plurality of transmission signals at respectively different timings.

Subsequently to the process in S102, the wave detector 115 performs frequency analysis on the output signal of the transducer 111 so as to calculate the frequency information indicating the time to frequency characteristic of the output signal (S103).

In the control unit 120, the acquisition unit 134 specifies the time to frequency characteristic of the reception signal from the frequency information (S104).

Then, the acquisition unit 134 acquires the relative speed Vr and the current distance Dcrr, based on the time to frequency characteristic of the transmission signal and the time to frequency characteristic of the reception signal (S105). Specifically, the acquisition unit 134 calculates the relative speed Vr, based on the frequency difference fs between the transmission signal and the reception signal. In addition, the acquisition unit 134 calculates the current distance Dcrr, based on the time difference td between the transmission timing of the transmission signal and of the reception timing of the reception signal.

The output unit 137 outputs the current distance Dcrr to the outside, as the information relating to the object (S106).

The estimation unit 135 estimates the next time distance Dnxt, based on the relative speed Vr and the current distance Dcrr (S107).

The adjustment unit 136 updates the setting value of the number of bursts and the setting value of the code length, based on the next time distance Dnxt (S108). For example, the adjustment unit 136 searches for the burst number information 142 by using the next time distance Dnxt as a key, and updates the setting value of the number of bursts with the value obtained through the search. In addition, the adjustment unit 136 searches for the code length information 143 by using the next time distance Dnxt as a key, and updates the setting value of the code length with the value obtained through the search.

Subsequently, the object detection device 100 (for example, the control unit 120) determines whether or not it is the subsequent detection timing (S109). For example, the control unit 120 determines whether or not it is the subsequent detection timing, based on a fact that a time elapsed from a start timing of the process in S102 exceeds a predetermined time (for example, tstep) set as a time interval for the detection timing. A method of determining whether or not it is the subordinate detection timing is not limited thereto.

In a case where it is determined that it is not the subordinate detection timing (S109, No), the process in S109 is performed again. In a case where it is determined that it is the subordinate detection timing (S109, Yes), the process in S102 is controlled.

As described above, the object detection device 100 according to the first embodiment has the transmission/reception unit 110, the acquisition unit 134, the estimation unit 135, and the adjustment unit 136 which are configured as follows. The transmission/reception unit 110 has the vibrator 112 capable of transmitting and receiving the ultrasound. The vibrator 112 transmits the plurality of transmission signals at respectively different timings, and receives each of the plurality of transmission signals reflected on the object, as the reception signal. The acquisition unit 134 acquires the distance up to the object (current distance Dcrr) and the relative speed of the object (the relative speed Vr), based on the time difference between the transmission timing of the transmission signal and the reception timing of the reception signal which is a reflected wave of the transmission signal, and the frequency difference between the transmission signal and the reception signal. The estimation unit 135 estimates the distance up to the object (next time distance Dnxt) at the subsequent detection timing, that is, at the timing for subsequently transmitting the transmission signal, based on the current distance Dcrr and the relative speed Vr. The adjustment unit 136 adjusts the number of bursts of the transmission signal to be transmitted at the subordinate detection timing, based on the estimated next time distance Dnxt.

According to this configuration, even in a case where the distance between the object detection device 100 and the object is rapidly changed, the distance up to the object can be prevented from deviating from the detectable range at each detection timing. That is, the object detection device 100 can continuously detect the object without losing sight of the object detected once.

Furthermore, the adjustment unit 136 sets the second value, as the number of bursts, in a case where the next time distance Dnxt is the first value, and sets the fourth value greater than the second value, as the number of bursts, in a case where the next time distance Dnxt is the third value greater than the first value.

According to this configuration, it is possible to adjust the number of bursts so that that the distance up to the object does not deviate from the detectable range at the subsequent detection timing.

In addition, according to the first embodiment, the transmission/reception unit 110 transmits each of the plurality of transmission signals by performing the encoding on the transmission signal. The adjustment unit 136 sets the sixth value, as the code length, in a case where the next time distance Dnxt is the fifth value, and sets the eighth value greater than the sixth value, as the code length, in a case where the next time distance Dnxt is the seventh value greater than the fifth value.

The encoding is performed on the transmission signal. Accordingly, it is possible to improve ability to specify the reception signal from the output signals of the transducer 111 which correspond to the vibration of the vibrator 112. In this manner, the upper limit value of the detectable range can be increased by performing the encoding on the transmission signal, compared to a case where the encoding is not performed on the transmission signal. An advantageous effect of improving ability to detect the reception signal increases as the code length is lengthened. According to the first embodiment, the object detection device 100 is configured to lengthen the code length in a case where the next time distance Dnxt is long. Therefore, the ability to detect the object located at a long distance is significantly improved.

Furthermore, the configuration of performing the encoding on the transmission signal is effective in a case where the plurality of object detection devices 100 are provided. For example, according to the configuration having the plurality of object detection devices 101 to 104 as illustrated in FIG. 1, if the object detection devices 101 to 104 respectively have the different identification information, in a case where the transmission signal transmitted by one object detection device 100 returns as the reception signal, it is possible to prevent the other object detection device 100 from erroneously detecting the reception signal. That is, according to the first embodiment, the object detection devices 101 to 104 can respectively and simultaneously detect the information relating to the object by using mutually different identification information. According to this configuration, it is possible to more quickly and more precisely detect a situation around the vehicle 1, based on a plurality of simultaneously acquired detection results.

In the above description, the configuration of performing the encoding on the transmission signal has been described. However, the encoding may not necessarily be performed on the transmission signal.

According to the first embodiment, each of the transmission signals is the chirp signal in which the frequency repeatedly increases or decreases in every predetermined cycle.

The chirp signal is used as the transmission signal. In this manner, the instantaneous frequency of the reception signal, that is, the transmission signal returning after being reflected on the object, is changed in a sawtoothed shape. Accordingly, it is possible to easily specify the time to frequency characteristic of the reception signal from the time to frequency characteristic obtained by performing frequency analysis on the output signal of the transducer 111. In this manner, it is easy to acquire the frequency difference between the transmission signal and the reception signal.

The transmission signal may not be the chirp signal. A signal in which the time to frequency characteristic is provided with any desired characteristic may be adopted as the transmission signal. Furthermore, if it is possible to acquire the frequency difference between the transmission signal and the reception signal, the instantaneous frequency of the transmission signal may not necessarily vary.

In the above description, the transmission time of the transmission signal is defined as the number of waves, that is, the number of bursts. The number of bursts and the burst period (transmission time of the transmission signal) increase or decrease in conjunction with each other. Accordingly, the adjustment unit 136 can be configured to adjust the burst period instead of the number of bursts. Even in a case where the adjustment unit 136 is configured to adjust the burst period, it is possible to obtain the same advantageous effect as that in a case where the adjustment unit 136 is configured to adjust the number of bursts.

For example, the correspondence between the next time distance Dnxt and the setting value of the burst period is defined in advance. The correspondence is prepared in advance by using the same method as that of the burst number information 142. The adjustment unit 136 acquires the new setting value of the burst period, based on the correspondence between the next time distance Dnxt obtained by the estimation unit 135, and updates the old setting value of the burst period with the newly acquired setting value.

According to this configuration, similarly to a case where the adjustment unit 136 is configured to adjust the number of bursts, it is possible to continuously detect the object without losing sight of the object.

For example, the adjustment unit 136 may set the second value as the burst period, in a case where the next time distance Dnxt is the first value, and may set the fourth value greater than the second value, as the burst period, in a case where the next time distance Dnxt is the third value greater than the first value.

According to this configuration, it is possible to adjust the number of bursts so that the distance up to the object does not deviate from the detectable range at the subsequent detection timing.

In addition, the adjustment unit 136 can be configured to adjust the code length together with the burst period. In this manner, it is possible to significantly improve the ability to detect the object located at a long distance.

In addition, even in a case where the adjustment unit 136 is configured to adjust the burst period, each of the plurality of transmission signals can be the chirp signal. In this manner, it is easy to acquire the frequency difference between the transmission signal and the reception signal.

Modification Example

According to the first embodiment, a configuration where the current distance Dcrr is calculated in the object detection device 100 has been described as an example. The current distance Dcrr may be calculated in the ECU.

For example, a temperature sensor is connected to the ECU, and the ECU calculates the sound velocity Vs by substituting a temperature detection value T obtained by the temperature sensor into Equation (3). If the acquisition unit 134 acquires the time difference td, the acquisition unit 134 transmits the time difference td to the ECU. The ECU calculates the current distance Dcrr by substituting the time difference td received from the acquisition unit 134 and the sound velocity Vs calculated by the ECU itself into Equation (2). The ECU transmits the current distance Dcrr to the acquisition unit 134. The estimation unit 135 calculates the next time distance Dnxt by using the current distance Dcrr received from the ECU by the acquisition unit 134. On the other hand, the ECU can use the current distance Dcrr calculated by the ECU itself in order to control obstacle avoidance, parking assistance, automatic cruise, and automatic driving.

In this way, the acquisition unit 134 may transmit the time difference td to the ECU, and the ECU may calculate the current distance Dcrr, based on the time difference td and the temperature detection value acquired from the temperature sensor.

The relative speed Vr may be similarly calculated by the ECU.

For example, similarly to the above-described configuration, the ECU calculates the sound velocity Vs by substituting the temperature detection value T obtained by the temperature sensor connected to the ECU itself into Equation (3). If the acquisition unit 134 acquires the frequency difference fs, the acquisition unit 134 transmits the frequency difference fs to the ECU. The ECU calculates the relative speed Vr by substituting the frequency difference fs received from the acquisition unit 134 and the sound velocity Vs calculated by the ECU itself into Equation (1). The ECU transmits the relative speed Vr to the acquisition unit 134. The estimation unit 135 calculates the next time distance Dnxt by using the relative speed Vr received from the ECU by the acquisition unit 134.

In this way, various modifications can be made for the function of the acquisition unit 134 to acquire the relative speed Vr or the next time distance Dnxt.

Second Embodiment

According to the first embodiment, a configuration where each of the object detection devices 100 controls the adjustment of the number of bursts (or the burst period) or the adjustment of the code length has been described as an example. However, the operations may be partially or entirely realized by external control.

Figure 8:
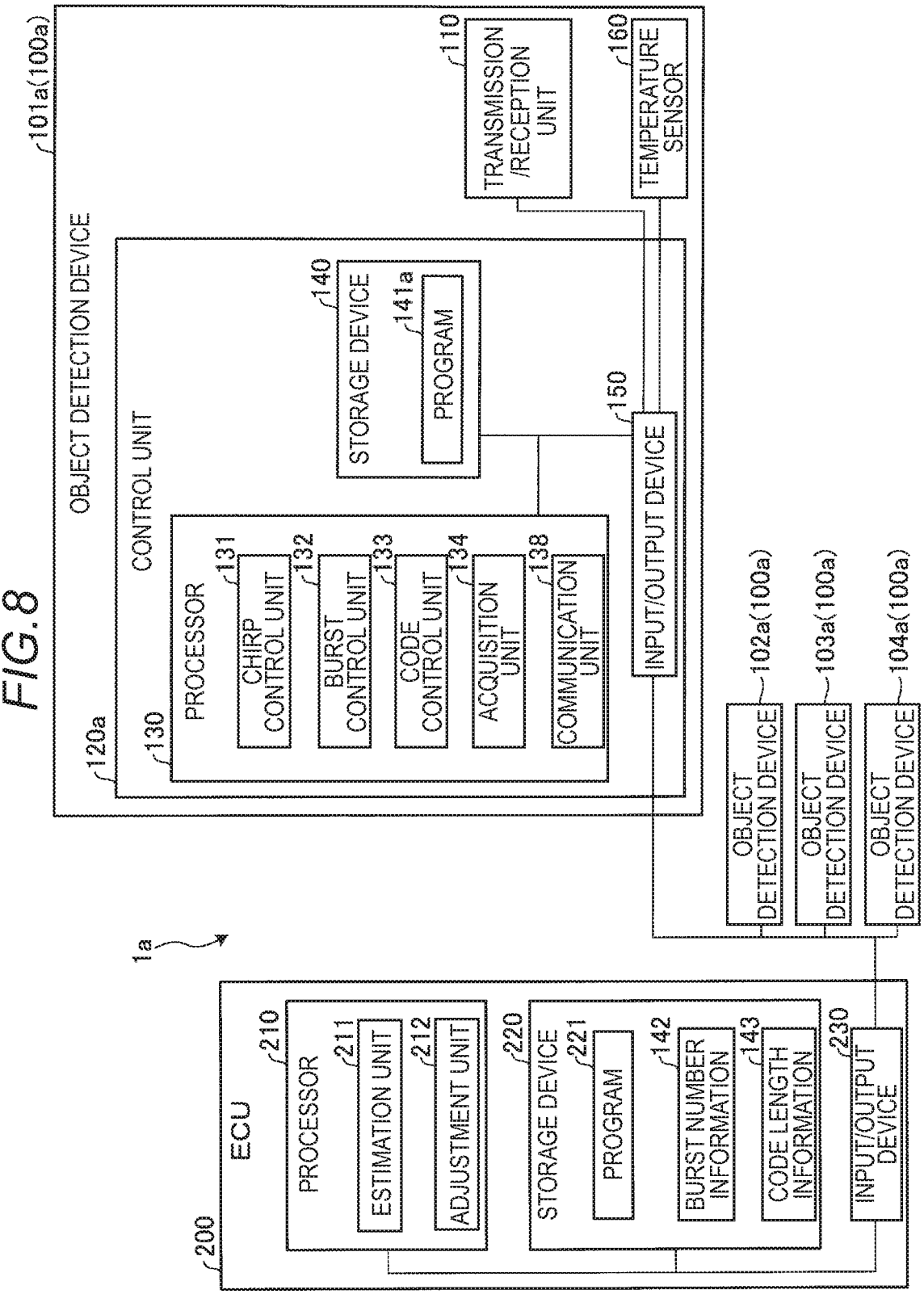
FIG. 8 is an exemplary and schematic block diagram illustrating a configuration of a vehicle serving as an object detection system according to a second embodiment.

FIG. 8 is an exemplary and schematic block diagram illustrating a configuration of the vehicle 1a as an object detection system according to a second embodiment. The same names and reference numerals as those according to the first embodiment will be given to the same configuration elements according to the first embodiment. Then, detailed description of the same configuration elements as those according to the first embodiment will be omitted.

As illustrated in the drawing, a vehicle 1a has an object detection device 101a to an object detection device 104a and an ECU 200.

The object detection devices 101a to 104a are sensing devices which detect information relating to a circumferentially existing object of the vehicle 1a. In addition, the ECU 200 is a microcomputer which controls an operation of the vehicle 1a.

The object detection devices 101a to 104a and the ECU 200 are connected to each other via a communication path using a local interconnect network (LIN) or a universal asynchronous receiver-transmitter (UART).

The object detection devices 101a to 104a have the same configuration and the same function. FIG. 8 illustrates the configuration and the function of only the object detection device 101a among the object detection devices 101a to 104a, and the configuration and the function of the other object detection devices 102a to 104a are omitted in the illustration. Hereinafter, the object detection devices 101a to 104a may be collectively referred to as an object detection device 100a, in some cases.

The object detection device 100a includes a control unit 120a and the transmission/reception unit 110.

The control unit 120a includes the processor 130, the storage device 140, and the input/output device 150. A program 141a is stored in advance in the storage device 140.

The processor 130 executes the program 141a so as to function as the chirp control unit 131, the burst control unit 132, the code control unit 133, the acquisition unit 134, and the communication unit 138.

The communication unit 138 outputs the relative speed Vr and the current distance Dcrr which are acquired by the acquisition unit 134 to the ECU 200. The communication unit 138 transmits the information to the ECU 200 via the input/output device 150.

The ECU 200 adjusts the number of bursts and the code length for each of the object detection devices 101a to 104a, based on the information received from each of the object detection devices 101a to 104a.

Specifically, as a hardware configuration, the ECU 200 includes a processor 210, a storage device 220, and an input/output device 230.

The input/output device 230 is an interface device for communicating with the object detection device 100a.

The storage device 220 includes a nonvolatile storage medium such as a ROM, a flash memory, an HDD, and an SD card, and a volatile storage medium such as a RAM and a register. Then, a program 221 is stored in advance in the storage device 220. Furthermore, burst number information 142 and code length information 143 are stored in advance in the storage device 220.

For example, the processor 210 is a CPU. The processor 210 executes the program 221 stored in the storage device 220 so as to function as the estimation unit 211 and the adjustment unit 212.

The estimation unit 211 estimates the next time distance Dnxt, based on the relative speed Vr and the current distance Dcrr which are received from each object detection device 100a. The estimation unit 211 performs a process of estimating the next time distance Dnxt separately for each object detection device 100a.

The adjustment unit 212 adjusts the number of bursts and the code length of each object detection device 100a, based on the next time distance Dnxt estimated for each object detection device 100a.

For example, the adjustment unit 212 acquires each setting value by searching for the burst number information 142 or the code length information 143 by using the next time distance Dnxt as a key. Then, the adjustment unit 136 transmits each acquired setting value to the corresponding object detection device 100a.

In the object detection device 100a, the control unit 120a (for example, the communication unit 138) sets the setting value of the received number of bursts in the burst control unit 132. In this manner, the object detection device 100a can transmit the transmission signal of the newly set number of bursts at the subordinate detection timing. In addition, the control unit 120a (for example, the communication unit 138) sets the received setting value of the code length in the code control unit 133. In this manner, at the subordinate detection timing, the object detection device 100a can transmit the transmission signal to which the identification information of the newly set code length is assigned.

In this way, the second embodiment is different from the first embodiment in that the operation of estimating the next time distance Dnxt and the operation of adjusting the number of bursts and the code length are performed under the control of the ECU 200. According to this configuration, it is possible to simplify the function of each object detection device 100a.

Whether to perform each operation by using any one of the ECU 200 and the object detection device 100a can be optionally determined. For example, a configuration may be adopted so that the operation of estimating the next time distance Dnxt is performed in the object detection device 100a. A configuration is adopted so that the operation of the object detection device 100 according to the first embodiment is partially performed in the ECU 200. Accordingly, it is possible to simplify the function of the object detection device 100a.

Modification Example

Similarly to the first embodiment, the second embodiment can adopt various modifications for the function of the acquisition unit 134.

For example, the temperature sensor is connected to the ECU 200. The ECU 200 may transmit the temperature detection value T obtained by the temperature sensor to the acquisition unit 134 of each object detection device 100a. In this case, the acquisition unit 134 of each object detection device 100a calculates the sound velocity Vs, based on the temperature detection value T received from the ECU 200, and calculates the current distance Calculate Dcrr or the relative speed Vr by using the calculated sound velocity Vs.

Alternatively, the ECU 200 may calculate the sound velocity Vs, based on the temperature detection value T obtained by the temperature sensor, and may transmit the calculated sound velocity Vs to the acquisition unit 134 of each object detection device 100a. In this case, the acquisition unit 134 of each object detection device 100a calculates the current distance Dcrr or the relative speed Vr by using the sound velocity Vs received from the ECU 200.

Furthermore, the function of the acquisition unit 134 to acquire the current distance Dcrr and the relative speed Vr can be realized by the cooperation between the object detection device 100a and the ECU 200.

For example, the object detection device 100a may transmit the time difference td to the ECU 200. In this case, the ECU 200 (for example, the processor 210) calculates the current distance Dcrr, based on the time difference td received from the object detection device 100a and the temperature detection value T obtained by the temperature sensor connected to the ECU 200 itself.

Similarly, the object detection device 100a may transmit the frequency difference fs to the ECU 200. In this case, the ECU 200 calculates the relative speed Vr, based on the frequency difference fs received from the object detection device 100a and the temperature detection value T obtained by the temperature sensor connected to the ECU 200 itself.

In this way, various modifications can be made for the function of the acquisition unit 134. In a case where the ECU 200 determines the next time distance Dnxt, based on the time difference td and the relative speed Vr, the temperature sensor 160 can be omitted from the configuration of each object detection device 100a.

Third Embodiment

In a case where the plurality of object detection devices simultaneously detect the object, in each of the object detection devices, the transducer outputs a signal having a mixture between the ultrasound transmitted by the host device itself and the ultrasound transmitted by the other object detection device.

In this case, for example, according to the first embodiment and the second embodiment, the object detection devices 101 to 104 (101a to 104a) are caused to have mutually different identification information. In this manner, each object detection device 100 (100a) can specify the transmission signal transmitted by the host device itself and returning after being reflected on the object, from the output signal of the transducer 111.

Here, in a case where many devices emitting the ultrasound exist around the vehicle, such as a case where the vehicle including the object detection device having the same or similar type object detection system exists around the vehicle, in order to accurately detect the object, each object detection device needs to more reliably specify only the transmission signal transmitted by the host device itself, from the output signal of the transducer.

As one method of more reliably specifying only the ultrasound transmitted to each object detection device by the host device itself, it is conceivable to lengthen the code length of the identification information assigned to the transmission signal. However, in order to lengthen the code length, it is necessary to increase the number of bursts.

As previously described, if the number of bursts increases, the minimum value of the detectable range increases. Consequently, the object located at a near distance is less likely to be detected. In a case where the object in air is detected, for example, the ultrasound having the relatively low frequency in a range of 30 to 70 kHz is used. Accordingly, the minimum value of the detectable range is greatly affected.

Therefore, according to the third embodiment, mutually different patterns of the chirp signal are used as the transmission signal by the plurality of object detection devices. Each of the object detection devices uses the chirp signal having the mutually different pattern as the transmission signal. In this manner, each object detection device can more accurately specify the transmission signal transmitted by the host device itself without lengthening the code length.

Figure 9:
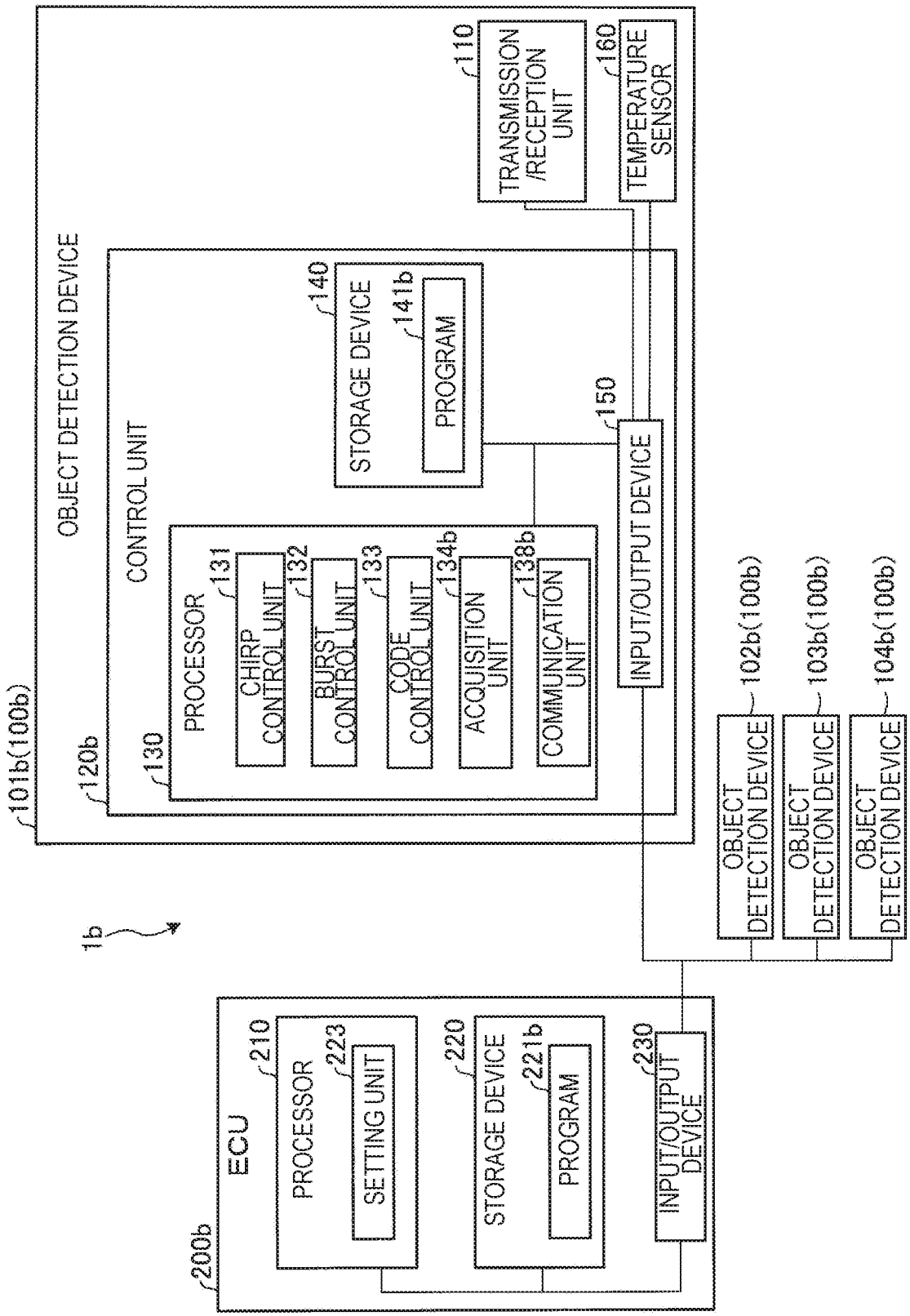
FIG. 9 is an exemplary and schematic block diagram illustrating a configuration of a vehicle serving as an object detection system according to a third embodiment.

FIG. 9 is an exemplary and schematic block diagram illustrating a configuration of a vehicle 1b serving as an object detection system according to a third embodiment. The same names and reference numerals as those according to the first or second embodiment will be assigned to the same configuration elements as those according to the first or second embodiment. Then, detailed description will be omitted for the same configuration elements as those according to the first or second embodiment.

As illustrated in the drawing, the vehicle 1b has an object detection device 101b to an object detection device 104b and an ECU 200b. The object detection devices 101b to 104b and the ECU 200b are connected to each other via a communication path.

The object detection devices 101b to 104b respectively have the same configuration and the same function. FIG. 9 illustrates the configuration and the function of only the object detection device 101b among the object detection devices 101b to 104b, and the configuration and function of the other object detection devices 102b to 104b are omitted in the illustration. Hereinafter, the object detection device 101b to 104b may be collectively referred to as an object detection device 100b, in some cases.

The ECU 200 b includes the processor 210, the storage device 220, and the input/output device 230. A program 221b is stored in advance in the storage device 220.

The processor 210 executes the program 221b so as to function as a setting unit 223.

The setting unit 223 sets the pattern of the chirp signal used as the transmission signal, for each of the object detection devices 101b to 104b.

Figure 10:
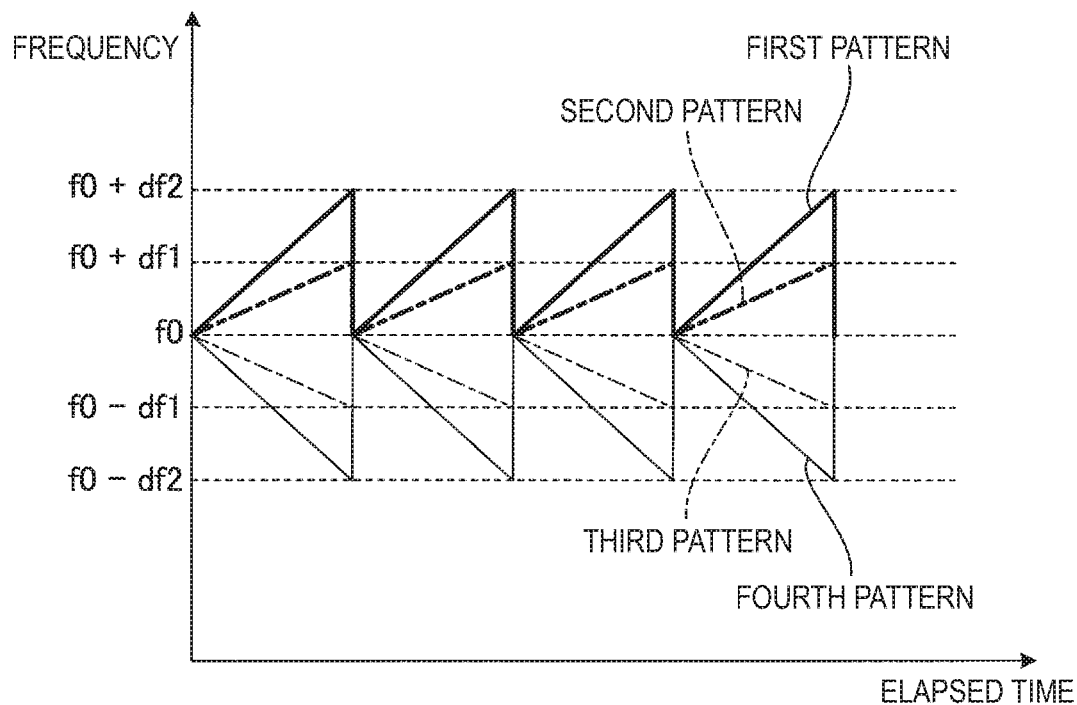
FIG. 10 is an exemplary and schematic view illustrating a chirp signal having a plurality of patterns used for the vehicle serving as the object detection system according to the third embodiment.

FIG. 10 is an exemplary and schematic view illustrating the chirp signal used for the vehicle 1b serving as the object detection system according to the third embodiment. In the drawing, the horizontal axis represents the elapsed time, and the vertical axis represents the frequency.

As illustrated in FIG. 10, according to the third embodiment, four patterns are prepared in advance. According to an example illustrated in the drawing, start frequencies of a first pattern to a fourth pattern are all set to f0. Then, end frequencies of the first pattern, the second pattern, the third pattern, and the fourth pattern are respectively set to f0+df2, f0+df1, f0−df1, and f0−df2. That is, the first to fourth patterns respectively have different chirp rates (change rate of the instantaneous frequency with the lapse of time).

Figure 11:
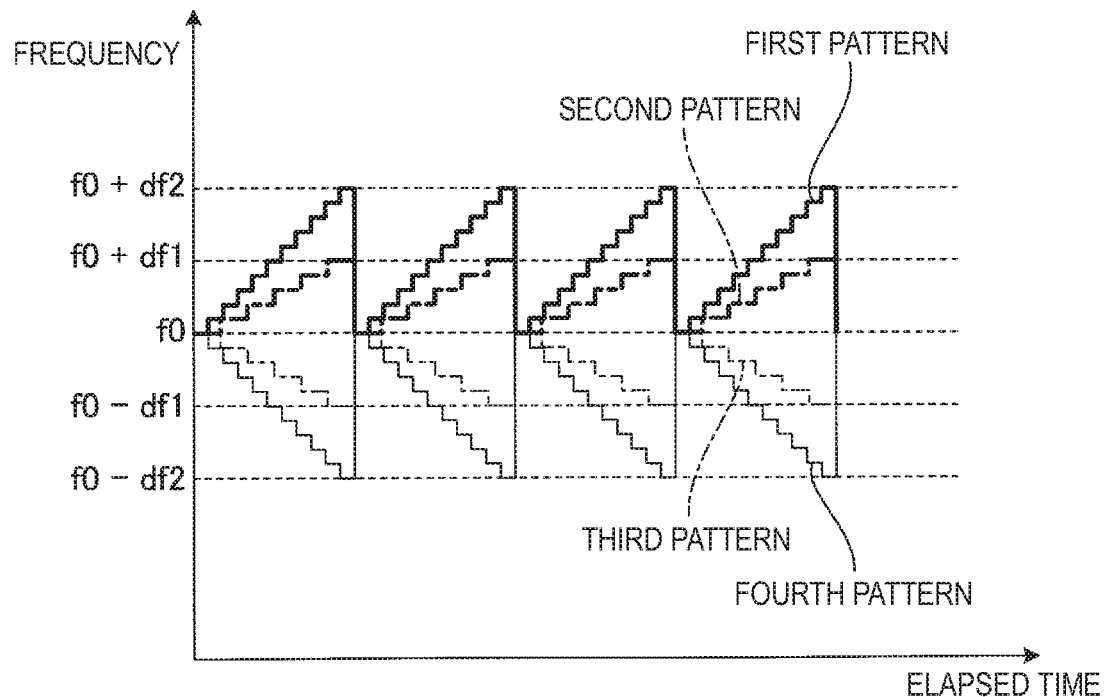
FIG. 11 is an exemplary and schematic view illustrating another example of the chirp signal having the plurality of patterns used for the vehicle serving as the object detection system according to the third embodiment.
Figure 12:
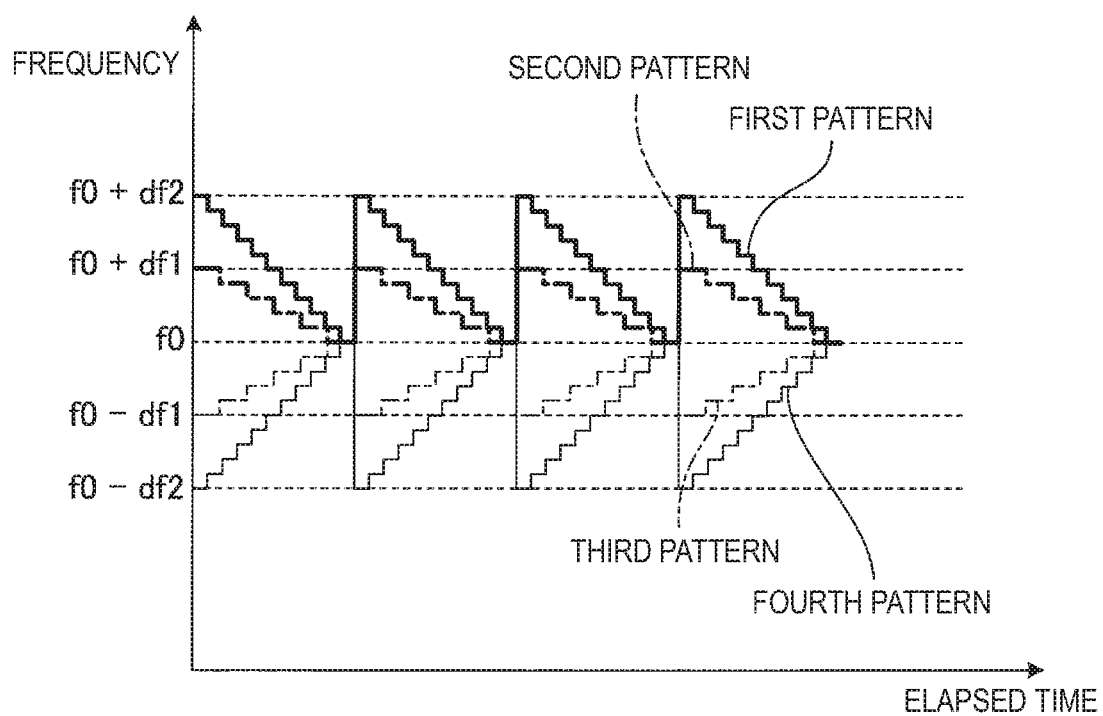
FIG. 12 is an exemplary and schematic view illustrating still another example of the chirp signal having the plurality of patterns used for the vehicle serving as the object detection system according to the third embodiment.

According to the present embodiment, the chirp signal to be used is not limited to the pattern as illustrated in FIG. 10. Any pattern may be used as long as the frequency (instantaneous frequency) repeatedly increases or decreases in every predetermined cycle in the pattern. For example, as illustrated in FIG. 11, the frequency may be changed in a stepwise manner. In addition, the start frequency is not limited to f0. For example, as illustrated in FIG. 12, the start frequency may be set to f0+df2 or f0−df2. In addition, as illustrated in FIG. 12, the start frequencies of the respective patterns may not be the same as each other.

The setting unit 223 sets the respectively different patterns out of the first to fourth patterns for each of the object detection devices 100b.

The above-described first to fourth patterns are examples of a plurality of respectively different patterns. The first to fourth patterns may be configured to be different from each other in other ways than the chirp rate.

The setting unit 223 may automatically set the pattern for each object detection device 100b or may set the pattern in accordance with an instruction from the outside (for example, an operator). In addition, the setting unit 223 may receive an input for designating the pattern to be set for each object detection device 100b, and may set the pattern in accordance with the received input.

Referring back to FIG. 9, the description will be continued. The object detection device 100b includes a control unit 120b and the transmission/reception unit 110.

The control unit 120b includes the processor 130, the storage device 140, and the input/output device 150. A program 141b is stored in advance in the storage device 140.

The processor 130 executes the program 141b so as to function as a chirp control unit 131b, the burst control unit 132, the code control unit 133, the acquisition unit 134b, and the communication unit 138b. The functional configuration elements realized by the processor 130 may be partially or entirely realized by means of hardware using a dedicated analog circuit.

The chirp control unit 131b supplies a voltage signal whose voltage is changed with the lapse of time in the pattern set by the setting unit 223, to the oscillator 113 (refer to FIG. 2). In this manner, the oscillator 113 can oscillate the chirp signal of the pattern set by the setting unit 223. Accordingly, the object detection devices 101b to 104b can transmit the chirp signal having the respectively different patterns out of the first to fourth patterns, as the transmission signal.

Based on the detection signal output from the transducer 111, the acquisition unit 134b specifies the transmission signal transmitted by the host device 100b and returning after being reflected on the object, as the reception signal.

For example, the acquisition unit 134b can specify the reception signal by using the first method described in the first embodiment. That is, the acquisition unit 134b specifies the reception signal by searching for the signal whose instantaneous frequency is changed in the set pattern, from the frequency information.

As described above, the setting unit 223 sets the mutually different chirp signals to be used by the object detection devices 101b to 104b. Accordingly, even in a case where the object detection devices 101b to 104b simultaneously transmit the transmission signals, it is possible to prevent each object detection device 100b from erroneously detecting the transmission signal transmitted by the other object detection device 100b, as the transmission signal returning after being transmitted by the host device itself.

According to another example, the acquisition unit 134b can specify the reception signal by using the third method described in the first embodiment. That is, the acquisition unit 134b searches for the signal whose instantaneous frequency is changed in the set pattern, from the frequency information, and searched for the signal having the same information as the identification information assigned to the transmission signal, from the output signal of the transducer 111, thereby specifying the reception signal.

According to the third method, not only the pattern of the chirp signal but also the identification information is used as a determination material for specifying the reception signal. In this manner, for example, even in a case where other devices emitting the ultrasound exist in addition to the object detection devices 101b to 104b, it is possible to prevent each object detection device 100b from erroneously detecting the transmission signal transmitted by the other device, as the transmission signal returning after being transmitted by the host device itself.

In addition, according to the third method, the information amount of the determination material for specifying the reception signal increases compared to a case of specifying the reception signal by using only the identification information. For example, in a case where the respectively different patterns out of the four patterns such as the first to fourth patterns are set to each object detection device 100b, the information amount of the determination material for specifying the reception signal increases to approximately the same extent that the code length is lengthened as much as 2 bits. That is, according to the third method, even if the code length is not lengthened, each object detection device 100b can more reliably specify only the transmission signal transmitted by the host device itself, as the reception signal, similarly to a case where the code length is lengthened.

Based on the specified reception signal, the acquisition unit 134b acquires the time difference (reciprocating time of the signal, for example, the time difference td) between the transmission timing of the transmission signal and the reception timing of the reception signal. Then, the acquisition unit 134b calculates the current distance Dcrr by using the acquired time difference td. For example, Equation (2) above can be used in calculating the current distance Dcrr.

Similarly to the acquisition unit 134 described in the first embodiment or the modification example according to the second embodiment, various modifications can be made for the configuration of the acquisition unit 134b. For example, the acquisition unit 134b may acquire the temperature detection value T or the sound velocity Vs from the ECU 200b. In addition, the object detection device 100b may acquire the time difference td, and the ECU 200b may acquire the current distance Dcrr, based on the time difference td and the temperature detection value T.

The communication unit 138b outputs the current distance Dcrr to the ECU 200b.

Figure 13:
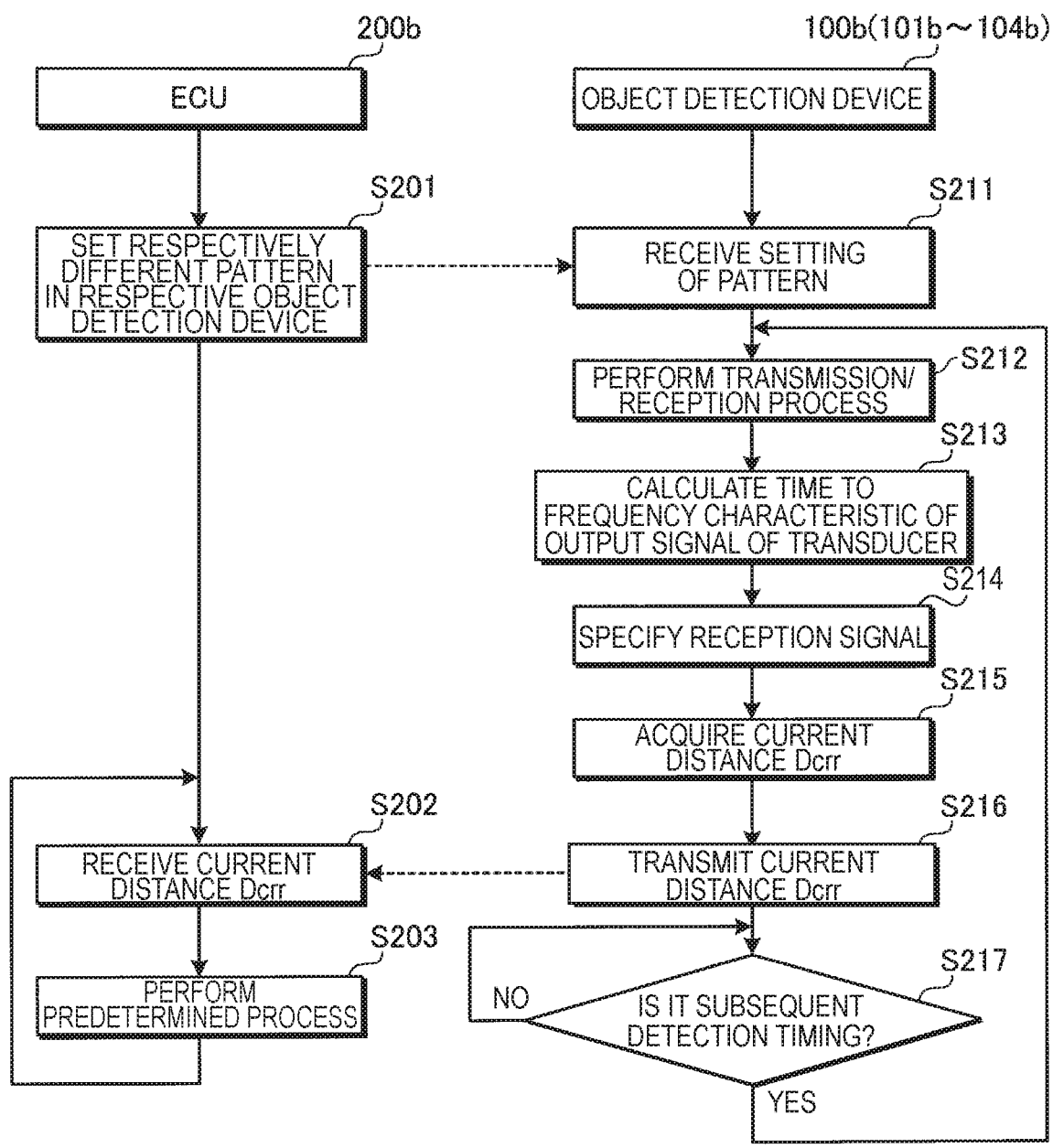
FIG. 13 is an exemplary and schematic flowchart illustrating a series of processes performed by the vehicle serving as the object detection system according to the third embodiment.

FIG. 13 is an exemplary and schematic flowchart illustrating a series of processes performed by the vehicle 1b serving as the object detection system according to the third embodiment.

First, in the ECU 200b, the setting unit 223 sets respectively different patterns out of the first to fourth patterns for the respective object detection devices 101b to 104b (S201). The setting of the pattern is transmitted to the corresponding object detection device 100b.

In each object detection device 100b, the communication unit 138b receives the setting of the pattern (S211). The communication unit 138b transmits the received setting of the pattern to the chirp control unit 131b.

Subsequently, the transmission/reception unit 110 performs the transmission/reception process (S212). For example, the chirp control unit 131b generates the voltage signal whose voltage is changed with the lapse of time in the set pattern, and supplies the generated voltage signal to the oscillator 113. The oscillator 113 generates the chirp signal having the set pattern, and the modulator 114 modulates the chirp signal generated by the oscillator 113. The modulator 114 performs the encoding to give an identification signal, or controls the output in accordance with the burst control signal. The transducer 111 transmits the transmission signal corresponding to the modulated chirp signal supplied from the modulator 114. After the signal is completely transmitted, the transducer 111 outputs the output signal corresponding to the mechanical vibration of the vibrator 112.

The wave detector 115 performs the frequency analysis on the output signal of the transducer 111 so as to calculate the frequency information indicating the time to frequency characteristic of the output signal (S213).

In the control unit 120b, the acquisition unit 134b specifies the time to frequency characteristic of the reception signal from the frequency information (S214). For example, the acquisition unit 134b specifies the reception signal by searching for the signal whose instantaneous frequency is changed in the pattern set in the object detection device 100b including the acquisition unit 134b itself.

The time to frequency characteristic obtained by performing the frequency analysis on the output signal is changed in accordance with the chirp rate (increase rate or decrease rate of the frequency). According to the present embodiment, the chirp rates are different from each other for each object detection device 100b. Therefore, it is possible to specify the reception signal transmitted by the object detection device 100b itself, from the specified time to frequency characteristic.

As described above, the acquisition unit 134b may specify the reception signal by using the third method. That is, the acquisition unit 134b may search for the signal whose instantaneous frequency is changed in the pattern set in the object detection device 100b including the acquisition unit 134b itself, from the frequency information, and may search for the signal having the same bit string as that of the identification information, from the output signal. In this manner, the acquisition unit 134b may specify the reception signal.

Subsequently, the acquisition unit 134b acquires the current distance Dcrr, based on the time difference between the transmission timing of the transmission signal and the reception timing of the reception signal (S215).

The communication unit 138b transmits the current distance Dcrr to the ECU 200b, as the information relating to the object (S216).

Then, the object detection device 100b (for example, the control unit 120b) determines whether or not it is the subsequent detection timing (S217).

In a case where the object detection device 100b determines that it is not the subsequent detection timing (S217, No), the process in S217 is performed again. In a case where the object detection device 100b determines that it is the subsequent detection timing (S217, Yes), the process in S212 is controlled.

The ECU 200b receives the current distance Dcrr transmitted by the object detection device 100b by performing the process in S216 (S202). The ECU 200b performs a predetermined process by using the current distance Dcrr received from each object detection device 100b (S203). For example, the predetermined processing is a process relating to controlling for obstacle avoidance, parking assistance, automatic cruise, and automatic driving. After the process in S203 is performed, the process in S202 is performed again.

As described above, according to the third embodiment, the vehicle 1b serving as the object detection system includes the plurality of object detection devices 100b respectively including the transmission/reception unit 110 and the acquisition unit 134b, and the setting unit 223 which sets the respectively different patterns for the plurality of object detection devices 100b. In each object detection device 100b, the transmission/reception unit 110 transmits the chirp signal in which frequency repeatedly increases or decreases in every predetermined cycle in the pattern set by the setting unit 223, as the transmission signal, and outputs the detection signal corresponding to the circumferentially received ultrasound. Then, based on the pattern set by the setting unit 223, the acquisition unit 134b specifies the transmission signal transmitted by the object detection device 100b including the acquisition unit 134b itself and returning after being reflected on the object, which is included in the detection signal, as the reception signal. The acquisition unit 134b acquires the information relating to the object, based on the transmission signal and the reception signal.

According to this configuration, even in a case where the object detection devices 101b to 104b simultaneously transmit the transmission signals, it is possible to prevent each object detection device 100b from erroneously detecting the transmission signal transmitted by the other object detection device 100b, as the transmission signal returning after being transmitted by the host device itself.

In addition, the transmission/reception unit 110 performs the encoding to give the identification information to the transmission signal. The acquisition unit 134b may specify the reception signal, based on the pattern set by the setting unit 223 and the identification signal assigned to the transmission signal.

According to this configuration, even in a case where other devices emitting the ultrasonic around exist around the vehicle 1b, it is possible to prevent each object detection device 100b from erroneously detecting the ultrasound transmitted by the other device, as the transmission signal returning after being transmitted by the host device itself.

In addition, according to this configuration, even if the code length is not lengthened, it is possible to more reliably specify the reception signal, similarly to a case where the code length is lengthened.

In a case where two object detection devices 100b disposed close to each other simultaneously transmit the transmission signals, the two object detection devices 100b may receive the two transmission signals transmitted by the two object detection devices 100b and returning after being reflected on the object at approximately the same timing, in some cases. Then, the time difference between the reception timings of the two transmission signals decreases as the distance between the two the object detection devices 100b is closer.

Therefore, a configuration may be adopted as follows. The setting unit 223 sets one pattern out of two patterns in which the magnitude sequential orders of the chirp rates are not consecutive out of the plurality of patterns having different chirp rates set in any one of the object detection devices 100b, for the first object detection device 100b out of the plurality of object detection devices 100b. The setting unit 223 sets the other pattern out of the two patterns, for the second object detection device 100b disposed closest to the first of the object detection device 100b.

For example, in the rear bumper of the vehicle 1b, it is conceivable to adopt a case where the object detection devices 101b, 102b, 103b, and 104b are arranged in this order in the vehicle width direction. The magnitude of the chirp rates of the first to fourth pattern increases in the order of the fourth pattern, the third pattern, the second pattern, and the first pattern. In this case, the setting unit 223 sets the second pattern for the object detection device 101b, sets the fourth pattern for the object detection device 102b, sets the first pattern for the object detection device 103b, and sets the third pattern for the object detection device 104b.

According to the above-described setting example, the respectively different patterns in which the magnitude sequential orders of the chirp rates are separated as much as two or more are set for any two object detection devices 100b in which the sequential orders of installation positions are adjacent to each other out of the object detection devices 101b to 104b.

According to the above-described configuration, the patterns of the transmission signal can be as dissimilar as possible between the two object detection devices 100b disposed closest to each other. Accordingly, each of the two the object detection devices 100b can more reliably specify the transmission signal transmitted by the host device 100b itself, even in a case where the reception timings of the two transmission signals transmitted from the two object detection devices 100b are close to each other.

A method of setting the pattern of the chirp signal is not limited to the above-described method. The setting unit 223 can set the pattern of the chirp signal for each of the object detection devices 100b by using any desired method.

The third embodiment described above can be used in combination with the first embodiment or the second embodiment.

For example, the acquisition unit 134b acquires the current distance Dcrr based on the time difference between the transmission timing of the transmission signal and the reception timing of the reception signal, and acquires the relative speed Vr, based on the frequency difference between the transmission signal and the reception signal. Then, each object detection device 100b or the ECU 200b includes the estimation unit that estimates the next time distance Dnxt, based on the current distance Dcrr and the relative speed Vr, and the adjustment unit that adjusts the number of bursts or the burst period of the transmission signal transmitted at the subsequent detection timing, based on the estimated next time distance Dnxt.

According to this configuration, even in a case where the distance between the object detection system (vehicle 1b) and the object is rapidly changed, the distance up to the object can be prevented from deviating from the detectable range of each object detection device 100b at each detection timing. That is, the object detection system (vehicle 1b) can continuously detect the object without losing sight of the object detected once.

In addition, in a case where the next time distance Dnxt is the first value, the adjustment unit that can be included in each object detection device 100b or the ECU 200b sets the second value, as the number of bursts or the burst period of the transmission signal to be transmitted at the subsequent detection timing. In a case where the next time distance Dnxt is the third value greater than the first value, the adjustment unit sets the fourth value greater than the second value, as the number of bursts or the burst period of the transmission signal to be transmitted at the subsequent detection timing.

According to this configuration, it is possible to adjust the number of bursts or the burst period so that the distance up to the object at the subsequent detection timing does not deviate from the detectable range of each object detection device 100b.

In addition, in a case where the next time distance Dnxt is the fifth value, the adjustment unit that can be included in each object detection device 100b or the ECU 200b sets the sixth value, as the code length. In a case where the next time distance Dnxt is the seventh value greater than the fifth value, the adjustment unit sets the eighth value greater than the sixth value, as the code length. For example, the code length is individually set for each object detection device 100b.

According to this configuration, it is possible to significantly improve the ability to detect the object located at a long distance.

An object detection device according to an aspect of this disclosure includes, for example, a transmission/reception unit that has a vibrator capable of transmitting and receiving ultrasound, that causes the vibrator to transmit a plurality of transmission signals at respectively different timings, and that receives each of the plurality of transmission signals returning after being reflected on a circumferentially existing object, as a reception signal, an acquisition unit that acquires a first distance serving as a distance up to the object, based on a time difference between a transmission timing of a first transmission signal out of the plurality of transmission signals and a reception timing of a first reception signal which is the first transmission signal returning after being reflected on the object, and that acquires a relative speed of the object, based on a frequency difference between the first transmission signal and the first reception signal, an estimation unit that estimates a second distance serving as the distance up to the object at a transmission timing of a second transmission signal to be transmitted subsequently to the first transmission signal, based on the first distance and the relative speed, and an adjustment unit that adjusts the number of waves or a transmission time of the second transmission signal, based on the second distance.

According to this configuration, even in a case where the distance between the object detection device and the object is rapidly changed, it is possible to continuously detect the object without losing sight of the object detected once.

In the object detection device, in a case where the second distance is a first value, the adjustment unit may set a second value, as the number of waves or the transmission time of the second transmission signal, and in a case where the second distance is a third value greater than the first value, the adjustment unit may set a fourth value greater than the second value, as the number of waves or the transmission time of the second transmission signal.

According to this configuration, the number of waves or the transmission time of the second transmission signal can be adjusted so that the distance up to the object does not deviate from a detectable range of the object detection device at the transmission timing of the second transmission signal.

In the object detection device, each of the plurality of transmission signals may be a chirp signal in which a frequency repeatedly increases or decreases in every predetermined cycle.

According to this configuration, it becomes easy to acquire a frequency difference between the transmission signal and the reception signal.

In the object detection device, a pattern indicating an increase or a decrease of the frequency in the predetermined cycle in the chirp signal may be preset in the object detection device. The acquisition unit may specify the reception signal of the transmission signal transmitted by the transmission/reception unit and returning after being reflected on the object, based on the pattern preset in the object detection device.

According to this configuration, the object detection device can specify the transmission signal transmitted by the host device itself, which is included in the detection signal output by the transmission/reception unit, as the reception signal.

In the object detection device, the transmission/reception unit may perform encoding for assigning identification information to each of the plurality of transmission signals. In a case where the second distance is a fifth value, the adjustment unit may set a sixth value, as a code length of the identification information to be assigned to the second transmission signal, and in a case where the second distance is a seventh value greater than the fifth value, the adjustment unit may set an eighth value greater than the sixth value, as the code length of the identification information to be assigned to the second transmission signal.

According to this configuration, ability to detect the object located at a long distance is improved.

In the object detection device, the transmission/reception unit may perform encoding for assigning identification information to each of the plurality of transmission signals. The acquisition unit may specify the reception signal of the transmission signal transmitted by the transmission/reception unit and returning after being reflected on the object, based on the pattern and the identification information assigned to each of the transmission signals.

According to this configuration, ability to specify the reception signal is improved.

An object detection system according to another aspect of this disclosure includes, for example, a transmission/reception unit that has a vibrator capable of transmitting and receiving ultrasound, that causes the vibrator to transmit a plurality of transmission signals at respectively different timings, and that receives each of the plurality of transmission signals returning after being reflected on a circumferentially existing object, as a reception signal, an acquisition unit that acquires a first distance serving as a distance up to the object, based on a time difference between a transmission timing of a first transmission signal out of the plurality of transmission signals and a reception timing of a first reception signal which is the first transmission signal returning after being reflected on the object, and that acquires a relative speed of the object, based on a frequency difference between the first transmission signal and the first reception signal, an estimation unit that estimates a second distance serving as the distance up to the object at a transmission timing of a second transmission signal to be transmitted subsequently to the first transmission signal, based on the first distance and the relative speed, and an adjustment unit that adjusts the number of waves or a transmission time of the second transmission signal, based on the second distance.

According to this configuration, even in a case where the distance between the object detection device and the object is rapidly changed, it is possible to continuously detect the object without losing sight of the object detected once.

In the object detection system, in a case where the second distance is a first value, the adjustment unit may set a second value, as the number of waves or the transmission time of the second transmission signal, and in a case where the second distance is a third value greater than the first value, the adjustment unit may set a fourth value greater than the second value, as the number of waves or the transmission time of the second transmission signal.

According to this configuration, the number of waves or the transmission time of the second transmission signal can be adjusted so that the distance up to the object does not deviate from the detectable range of the object detection device at the transmission timing of the second transmission signal.

In the object detection system, each of the plurality of transmission signals may be a chirp signal in which a frequency repeatedly increases or decreases in every predetermined cycle.

According to this configuration, it becomes easy to acquire the frequency difference between the transmission signal and the reception signal.

In the object detection system, a pattern indicating an increase or a decrease of the frequency in the predetermined cycle in the chirp signal may be preset. The acquisition unit may specify the reception signal of the transmission signal transmitted by the transmission/reception unit and returning after being reflected on the object, based on the preset pattern.

According to this configuration, the object detection device can specify the transmission signal transmitted by the host device itself, which is included in the detection signal output by the transmission/reception unit, as the reception signal.

In the object detection system, the transmission/reception unit may perform encoding for assigning identification information to each of the plurality of transmission signals. In a case where the second distance is a fifth value, the adjustment unit may set a sixth value, as a code length of the identification information to be assigned to the second transmission signal, and in a case where the second distance is a seventh value greater than the fifth value, the adjustment unit may set an eighth value greater than the sixth value, as the code length of the identification information to be assigned to the second transmission signal.

According to this configuration, ability to detect the object located at a long distance is improved.

In the object detection system, the transmission/reception unit may perform encoding for assigning identification information to each of the plurality of transmission signals. The acquisition unit may specify the reception signal of the transmission signal transmitted by the transmission/reception unit and returning after being reflected on the object, based on the pattern and the identification information assigned to each of the transmission signals.

According to this configuration, ability to specify the reception signal is improved.

The object detection system may further include a plurality of object detection devices respectively including the transmission/reception unit and the acquisition unit, and a setting unit that sets respectively different patterns in the plurality of object detection devices.

According to this configuration, it is possible to prevent one of the respective object detection devices from erroneously detecting the transmission signal transmitted by the other object detection device, as the transmission signal returning after being transmitted by the host device itself.

An object detection system according to another aspect of this disclosure includes a plurality of object detection devices each including a transmission/reception unit that has a vibrator capable of transmitting and receiving ultrasound, that causes the vibrator to transmit a transmission signal which is a chirp signal in which a frequency repeatedly increases or decreases in every predetermined cycle according to a preset pattern, and outputs a detection signal corresponding to circumferentially received ultrasound, and an acquisition unit that specifies the transmission signal included in the detection signal and returning after being reflected on a circumferentially existing object, as a reception signal, based on the pattern, and that acquires information relating to the object, based on the transmission signal and the reception signal, and a setting unit that sets respectively different patterns in the plurality of object detection devices.

According to this configuration, it is possible to prevent one of the respective object detection devices from erroneously detecting the transmission signal transmitted by the other object detection device, as the transmission signal returning after being transmitted by the host device itself.

In the object detection system, the transmission/reception unit may perform encoding for assigning identification information to the transmission signal. The acquisition unit may specify the reception signal, based on the pattern and the identification information assigned to the transmission signal.

According to this configuration, even in a case where the other device emitting the ultrasound exists around the host object detection system, it is possible to prevent one of the respective object detection devices from erroneously detecting the ultrasound transmitted by the other object detection device, as the transmission signal returning after being transmitted by the host device itself.

In addition, according to this configuration, similarly to a case of lengthening the code length, the reception signal can be more reliably specified without lengthening the code length.

In the object detection system, out of a plurality of patterns having respectively different chirp rates to be set in any of the object detection devices, the setting unit may set one of the two patterns in which magnitude sequential orders of the chirp rates are not consecutive, in a first object detection device out of the plurality of object detection devices, and may set the other of the two patterns in a second object detection device installed closest to the first object detection device.

According to this configuration, even in a case where the reception timings of the two transmission signals transmitted from the two object detection devices are close to each other, each of the two object detection devices installed close to each other can more reliably specify the transmission signal transmitted by the host object detection device.

In the object detection system, the acquisition unit may acquire a first distance serving as a distance up to the object, based on a time difference between a transmission timing of the transmission signal and a reception timing of the reception signal, and may acquire a relative speed of the object, based on a frequency difference between the transmission signal and the reception signal. The object detection system may further include an estimation unit that estimates a second distance serving as the distance up to the object at a transmission timing of a second transmission signal to be transmitted subsequently at the transmission timing of the transmission signal, based on the first distance and the relative speed, and an adjustment unit that adjusts the number of waves or a transmission time of the second transmission signal, based on the second distance.

According to this configuration, even in a case where the distance between the object detection device and the object is rapidly changed, it is possible to continuously detect the object without losing sight of the object detected once.

In the object detection system, in a case where the second distance is a first value, the adjustment unit may set a second value, as the number of waves or the transmission time of the second transmission signal, and in a case where the second distance is a third value greater than the first value, the adjustment unit may set a fourth value greater than the second value, as the number of waves or the transmission time of the second transmission signal.

According to this configuration, the number of waves or the transmission time of the second transmission signal can be adjusted so that the distance up to the object does not deviate from the detectable range of the object detection device at the transmission timing of the second transmission signal.

In the object detection system, the transmission/reception unit may perform encoding for assigning identification information to the transmission signal. In a case where the second distance is a fifth value, the adjustment unit may set a sixth value, as a code length of the identification information to be assigned to the second transmission signal, and in a case where the second distance is a seventh value greater than the fifth value, the adjustment unit may set an eighth value greater than the sixth value, as the code length of the identification information to be assigned to the second transmission signal.

According to this configuration, ability to detect the object located at a long distance is improved.

Hitherto, the embodiments disclosed here have been described as examples.

However, the above-described embodiments and modification examples are merely examples, and do not intend to limit the scope of the invention. The above-described embodiment and modification examples can be embodied in other various forms. Various omissions, substitutions, combinations, and modifications can be made within the scope not departing from the gist of the invention. The configurations and shapes of the respective embodiments or the respective modification examples can be partially replaced with each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
    a transmission/reception unit that has a vibrator capable of transmitting and receiving ultrasound, that causes the vibrator to transmit a plurality of transmission signals at respectively different timings, and that receives each of the plurality of transmission signals returning after being reflected on a circumferentially existing object, as a reception signal; and
    a processor configured to implement:
        an acquisition unit that acquires a first distance serving as a distance up to the object, based on a time difference between a transmission timing of a first transmission signal out of the plurality of transmission signals and a reception timing of a first reception signal which is the first transmission signal returning after being reflected on the object, and that acquires a relative speed of the object, based on a frequency difference between the first transmission signal and the first reception signal;

an estimation unit that estimates a second distance serving as the distance up to the object at a transmission timing of a second transmission signal to be transmitted subsequently to the first transmission signal, based on the first distance and the relative speed; and an adjustment unit that adjusts the number of waves or a transmission time duration of the second transmission signal, based on the second distance.

2. The object detection device according to claim 1, wherein when the second distance is a first value, the adjustment unit sets a second value, as the number of waves or the transmission time of the second transmission signal, and in a case where the second distance is a third value greater than the first value, the adjustment unit sets a fourth value greater than the second value, as the number of waves or the transmission duration of the second transmission signal.

3. The object detection device according to claim 1, wherein each of the plurality of transmission signals is a chirp signal in which a frequency repeatedly increases or decreases in every predetermined cycle.

4. The object detection device according to claim 3, wherein a pattern indicating an increase or a decrease of the frequency in the predetermined cycle in the chirp signal is preset in the object detection device, and the acquisition unit specifies the reception signal of the transmission signal transmitted by the transmission/reception unit and returning after being reflected on the object, based on the pattern preset in the object detection device.

5. The object detection device according to claim 1, wherein the transmission/reception unit performs encoding for assigning identification information to each of the plurality of transmission signals, and when the second distance is a fifth value, the adjustment unit sets a sixth value, as a code length of the identification information to be assigned to the second transmission signal, and in a case where the second distance is a seventh value greater than the fifth value, the adjustment unit sets an eighth value greater than the sixth value, as the code length of the identification information to be assigned to the second transmission signal.

6. The object detection device according to claim 4, wherein the transmission/reception unit performs encoding for assigning identification information to each of the plurality of transmission signals, and the acquisition unit specifies the reception signal of the transmission signal transmitted by the transmission/reception unit and returning after being reflected on the object, based on the pattern and the identification information assigned to each of the transmission signals.

7. An object detection system comprising:

a transmission/reception unit that has a vibrator capable of transmitting and receiving ultrasound, that causes the vibrator to transmit a plurality of transmission signals at respectively different timings, and that receives each of the plurality of transmission signals returning after being reflected on a circumferentially existing object, as a reception signal; and a processor configured to implement:

an acquisition unit that acquires a first distance serving as a distance up to the object, based on a time difference between a transmission timing of a first transmission signal out of the plurality of transmission signals and a reception timing of a first reception signal which is the first transmission signal returning after being reflected on the object, and that acquires a relative speed of the object, based on a frequency difference between the first transmission signal and the first reception signal;

an estimation unit that estimates a second distance serving as the distance up to the object at a transmission timing of a second transmission signal to be transmitted subsequently to the first transmission signal, based on the first distance and the relative speed; and an adjustment unit that adjusts the number of waves or a transmission duration of the second transmission signal, based on the second distance.

8. The object detection system according to claim 7, wherein when the second distance is a first value, the adjustment unit sets a second value, as the number of waves or the transmission time of the second transmission signal, and in a case where the second distance is a third value greater than the first value, the adjustment unit sets a fourth value greater than the second value, as the number of waves or the transmission duration of the second transmission signal.

9. The object detection system according to claim 7, wherein each of the plurality of transmission signals is a chirp signal in which a frequency repeatedly increases or decreases in every predetermined cycle.

10. The object detection system according to claim 9, wherein a pattern indicating an increase or a decrease of the frequency in the predetermined cycle in the chirp signal is preset, and the acquisition unit specifies the reception signal of the transmission signal transmitted by the transmission/reception unit and returning after being reflected on the object, based on the preset pattern.

11. The object detection system according to claim 7, wherein the transmission/reception unit performs encoding for assigning identification information to each of the plurality of transmission signals, and when the second distance is a fifth value, the adjustment unit sets a sixth value, as a code length of the identification information to be assigned to the second transmission signal, and in a case where the second distance is a seventh value greater than the fifth value, the adjustment unit sets an eighth value greater than the sixth value, as the code length of the identification information to be assigned to the second transmission signal.

12. The object detection system according to claim 10, wherein the transmission/reception unit performs encoding for assigning identification information to each of the plurality of transmission signals, and the acquisition unit specifies the reception signal of the transmission signal transmitted by the transmission/reception unit and returning after being reflected on the object, based on the pattern and the identification information assigned to each of the transmission signals.

13. The object detection system according to claim 10, further comprising: a plurality of object detection devices respectively including the transmission/reception unit and the acquisition unit; and a setting unit that sets respectively different patterns in the plurality of object detection.

14. An object detection system comprising:
a plurality of object detection devices each including:
a transmission/reception unit that has a vibrator capable of transmitting and receiving ultrasound, that causes the vibrator to transmit a transmission signal which is a chirp signal in which a frequency repeatedly increases or decreases in every predetermined cycle according to a preset pattern, and outputs a detection signal corresponding to circumferentially received ultrasound, and
a processor configured to implement:
an acquisition unit that specifies the transmission signal included in the detection signal and returning after being reflected on a circumferentially existing object, as a reception signal, based on the pattern, and that acquires information relating to the object, based on the transmission signal and the reception signal; and
a setting unit that sets respectively different patterns in the plurality of object detection devices, wherein
the acquisition unit acquires a first distance serving as a distance up to the object, based on a time difference between a transmission timing of the transmission signal and a reception timing of the reception signal, and acquires a relative speed of the object, based on a frequency difference between the transmission signal and the reception signal, and
the object detection system further comprises:
an estimation unit that estimates a second distance serving as the distance up to the object at a transmission timing of a second transmission signal to be transmitted subsequently at the transmission timing of the transmission signal, based on the first distance and the relative speed; and
an adjustment unit that adjusts the number of waves or a transmission duration of the second transmission signal, based on the second distance.

15. The object detection system according to claim 14, wherein the transmission/reception unit performs encoding for assigning identification information to the transmission signal, and
the acquisition unit specifies the reception signal, based on the pattern and the identification information assigned to the transmission signal.

16. The object detection system according to claim 14, wherein
out of a plurality of patterns having respectively different chirp rates to be set in any of the object detection devices, the setting unit sets one of the two patterns in which magnitude sequential orders of the chirp rates are not consecutive, in a first object detection device out of the plurality of object detection devices, and sets the other of the two patterns in a second object detection device installed closest to the first object detection device.

17. The object detection system according to claim 14, wherein
when the second distance is a first value, the adjustment unit sets a second value, as the number of waves or the transmission time of the second transmission signal, and in a case where the second distance is a third value greater than the first value, the adjustment unit sets a fourth value greater than the second value, as the number of waves or the transmission time of the second transmission signal.

18. The object detection system according to claim 14, wherein
the transmission/reception unit performs encoding for assigning identification information to the transmission signal, and
when the second distance is a fifth value, the adjustment unit sets a sixth value, as a code length of the identification information to be assigned to the second transmission signal, and in a case where the second distance is a seventh value greater than the fifth value, the adjustment unit sets an eighth value greater than the sixth value, as the code length of the identification information to be assigned to the second transmission signal.

19. The object detection system according to claim 1, wherein when the second distance is greater than the first distance, the transmission duration is increased, and when the second distance is less than the first distance, the transmission duration is decreased.

* * * * *